(12) United States Patent
Danielson

(10) Patent No.: US 10,795,330 B2
(45) Date of Patent: Oct. 6, 2020

(54) SYMMETRY ALTERNATING DIRECTION METHOD OF MULTIPLIERS

(71) Applicant: Mitsubishi Electric Research Laboratories, Inc., Cambridge, MA (US)

(72) Inventor: Claus Danielson, Somerville, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 80 days.

(21) Appl. No.: 16/048,666

(22) Filed: Jul. 30, 2018

(65) Prior Publication Data

US 2020/0033822 A1    Jan. 30, 2020

(51) Int. Cl.
*G05B 17/02* (2006.01)
*G06F 17/16* (2006.01)

(52) U.S. Cl.
CPC .............. *G05B 17/02* (2013.01); *G06F 17/16* (2013.01)

(58) Field of Classification Search
CPC ........ G05B 17/02; G05B 13/048; G06F 17/16
USPC .......................................................... 700/31
See application file for complete search history.

(56) References Cited

U.S. PATENT DOCUMENTS

| | | | |
|---|---|---|---|
| 6,807,510 B1 | 10/2004 | Backstrom et al. | |
| 7,454,253 B2 | 11/2008 | Fan | |
| 10,409,233 B2 * | 9/2019 | Quirynen | G06F 17/11 |
| 10,461,540 B2 * | 10/2019 | Ghaemi | H02J 3/00 |
| 2004/0049299 A1 * | 3/2004 | Wojsznis | G05B 11/32 700/29 |
| 2014/0358254 A1 * | 12/2014 | Chu | G05B 13/048 700/29 |
| 2016/0170393 A1 * | 6/2016 | Sayyarrodsari | G05B 13/042 700/32 |
| 2019/0243320 A1 * | 8/2019 | Quirynen | G05B 13/048 |
| 2019/0356164 A1 * | 11/2019 | Ghaemi | H02J 13/0006 |

* cited by examiner

*Primary Examiner* — Chun Cao
(74) *Attorney, Agent, or Firm* — Gennadiy Vinokur; James McAleenan; Hironori Tsukamoto

(57) ABSTRACT

A method for controlling an operation of a machine exhibiting symmetries in dynamics of the machine, a cost of the operation of the machine, and constraints on the operation of the machine performs iteratively a control optimization until a termination condition is met to produce an optimal control input and controls the machine according to the optimal control input. An iteration includes transforming control inputs to the machine, a state of the machine, an output of the machine, and dual variables from an original domain to a symmetric domain using a symmetric transformation, solving an optimal control problem of the control inputs and the state for fixed values of the output and the dual variables in the symmetric domain, transforming the control inputs and the state from the symmetric domain into the original domain using an inverse of the symmetric transformation; projecting the outputs corresponding to the control inputs and the state in the original domain onto the constraints, and updating the dual variable based on the projected outputs.

20 Claims, 10 Drawing Sheets

SYMMETRY ALTERNATING DIRECTION METHOD OF MULTIPLIERS

TECHNICAL FIELD

This invention relates to predictive controllers for machines, and more particularly to predictive controllers generating motion for the machines subject to constraints on the machines.

BACKGROUND

A machine, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine can be modeled by a set of equations representing changes of the output over time as functions of current and previous inputs and previous outputs. During the operation, the machine can be defined by a state of the machine. The state of the machine is any set of information, in general time varying, that together with the model and future inputs, can define future motion. For example, the state of the machine can include an appropriate subset of current and past inputs and outputs.

The controller for the machine includes a processor for performing a method, and a memory for storing the model. The method is performed during fixed or variable periods. The controller receives the machine output and uses the output and/or the state of the machine to generate the input for the machine.

The machine is subject to constraints, which can be related to the physical environment, machine parts, and machine operational limits. The method is predictive when the controller generates the optimal motion based on the model, a current state of the machine, a desired future behavior of the machine, and the constraints. The controller solves an optimal control problem for a future time starting from the current time.

Some methods are based on model predictive control (MPC), e.g., U.S. Pat. Nos. 6,807,510, and 7,454,253, where an optimal control problem for a future time is based on the model, the current state, the desired motion, and the constraints. In some implementations, MPC obtains the implemented control input by solving a constrained finite-time optimal control (CFTOC) problem.

For some applications, there is a need to solve the CFTOC in real-time on an embedded computer with limited computational resources. Therefore, there is a need for simple and fast method for solving the CFTOC.

One popular type of methods for solving the CFTOC uses alternating direction method of multipliers (ADMM). The ADMM methods solve the CFTOC by repeating three steps of 1) solving an unconstrained finite-time optimal control (UFTOC) problem; 2) finding a constraint satisfying trajectory close to unconstrained trajectory; and 3) updating dual variables that trade-off constraint satisfaction and cost optimization.

The most computationally expensive step for the ADMM method is solving the UFTOC. Therefore, there is a need for a method for reducing the computational complexity needed to solve the UFTOC. It is especially challenging to solving s for large-scale system that require a large number of variables to describe their behavior for instance for instance large battery packs in electric or hybrid vehicles or heating, ventilation, and air-conditioning (hvac) control for a building with a large number of rooms.

SUMMARY

Some embodiments are based on recognition that a number of large-scale control problems have patterns, called symmetries, which can be exploited to reduce computational complexity. For example, although HVAC systems are complex, they are built from a large number of simple components that are repeated multiple times. For instance, an HVAC system typically has a single outdoor unit connected to multiple indoor units of the same design or one of a few available designs. It is realized that these symmetries in the HVAC system can be exploited to simplify computations required to generate a controller for an HVAC system.

Specifically, some embodiments are based on realization that when an operation of a machine exhibits symmetries in dynamics as well as in the cost and constraints of the operation, the parameters defying the operation of the machine can be transformed from their original domain to a decomposed domain allowing to decompose the optimization control problem that governs the performance of the controller. Such a decomposition allows to simplify solution of the constrained finite-time optimal control (CFTOC) problem in real-time on an embedded computer with limited computational resources and even for relatively large system such as HVAC system.

Some embodiments provide a predictive controller for a machine that uses models of the machine subject to constraints. In some embodiments, the controller is model predictive control (MPC) controller that uses alternating direction method of multipliers (ADMM) method to solve the CFTOC problem.

Some embodiments are based on recognition that ADMM iteratively solves an optimal control problem of the inputs and the state for fixed values of the output and the dual variables, and then updates the output and the dual variables for the next iteration. Specifically, the ADMM projects the outputs corresponding to the inputs and the state onto the constraints and updates the dual variable based on the projected outputs.

While solving the optimal control problem for fixed values of the output and the dual variables the invention transforms the constrained control problem into an unconstrained one, the solution of the unconstraint problem is still computationally demanding. To that end, some embodiments decompose the unconstraint problem into decoupled sub-problems to replace one large problem with a set of smaller sub-problems. These decoupled sub-problems can be solved either sequentially on a single processor or in parallel on multiple processors for a major reduction in computation.

Unfortunately, update of some variables, such as the output and sometimes dual variables, need to be solved with the original inputs, outputs, and states. Thus, some embodiments inverse-transform the solutions of the decoupled problems back into original domain. Some embodiments are based on recognition that transformations of the variables of the control problem back and forth from the original to the decoupled domain can potentially introduce significant computational cost. However, one embodiment provides a computationally efficient system and method for symmetric forward- and inverse-transformation of the variables. For example, the symmetric transformation is performed using a matrix transformation of a difference between a lower triangular matrix of ones and a super-diagonal matrix of sequentially descending numbers, wherein the size of the lower triangular matrix and the size of the super-diagonal matrix equal a number of the symmetries of the system. In such a manner, the computational cost of these transformations is insignificant compared to the computational savings provided by the decomposition of the original unconstraint problem.

Some embodiments are based on realization that the symmetric transformation can be performed when the symmetry of the operation of the machine are such that the dynamics of the system, the cost of the operation of the system, and the constraints on the operation of the system are invariant to at least some permutations of inputs and output of the system. Thus, the symmetric transformations provide computational improvement. In such a manner, the computational complexity of the control of different machines is reduced thereby improving the controller itself.

Accordingly, one embodiment discloses a method for controlling an operation of a machine exhibiting symmetries in dynamics of the machine, a cost of the operation of the machine, and constraints on the operation of the machine, wherein the method uses at least one processor coupled with stored instructions implementing the method, wherein the instructions, when executed by the processor carry out steps of the method that includes performing iteratively a control optimization until a termination condition is met to produce an optimal control input, wherein an iteration includes transforming control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine; solving an optimal control problem of the control inputs and the state for fixed values of the output and the dual variables in the symmetric domain; transforming the control inputs and the state from the symmetric domain into the original domain using an inverse of the symmetric transformation; projecting the outputs corresponding to the control inputs and the state in the original domain onto the constraints; and updating the dual variable based on the projected outputs; and controlling the machine according to the optimal control input.

Another embodiment discloses a system for controlling an operation of a machine exhibiting symmetries in dynamics of the machine, a cost of the operation of the machine, and constraints on the operation of the machine. The system includes at least one processor configured to performed iteratively a control optimization until a termination condition is met to produce an optimal control input and control the machine according to the optimal control input, wherein for performing an iteration, the processor is configured to transform control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine; solve an optimal control problem of the control inputs and the state for fixed values of the output and the dual variables in the symmetric domain; transform the control inputs and the state from the symmetric domain into the original domain using an inverse of the symmetric transformation; project the outputs corresponding to the control inputs and the state in the original domain onto the constraints; and update the dual variable based on the projected outputs.

Yet another embodiment discloses a non-transitory computer readable storage medium embodied thereon a program executable by a processor for performing a method, the method includes performing iteratively a control optimization until a termination condition is met to produce an optimal control input, wherein an iteration includes transforming control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine; solving an optimal control problem of the control inputs and the state for fixed values of the output and the dual variables in the symmetric domain; transforming the control inputs and the state from the symmetric domain into the original domain using an inverse of the symmetric transformation; projecting the outputs corresponding to the control inputs and the state in the original domain onto the constraints; and updating the dual variable based on the projected outputs; and controlling the machine according to the optimal control input.

DETAILED DESCRIPTION

Figure 1:
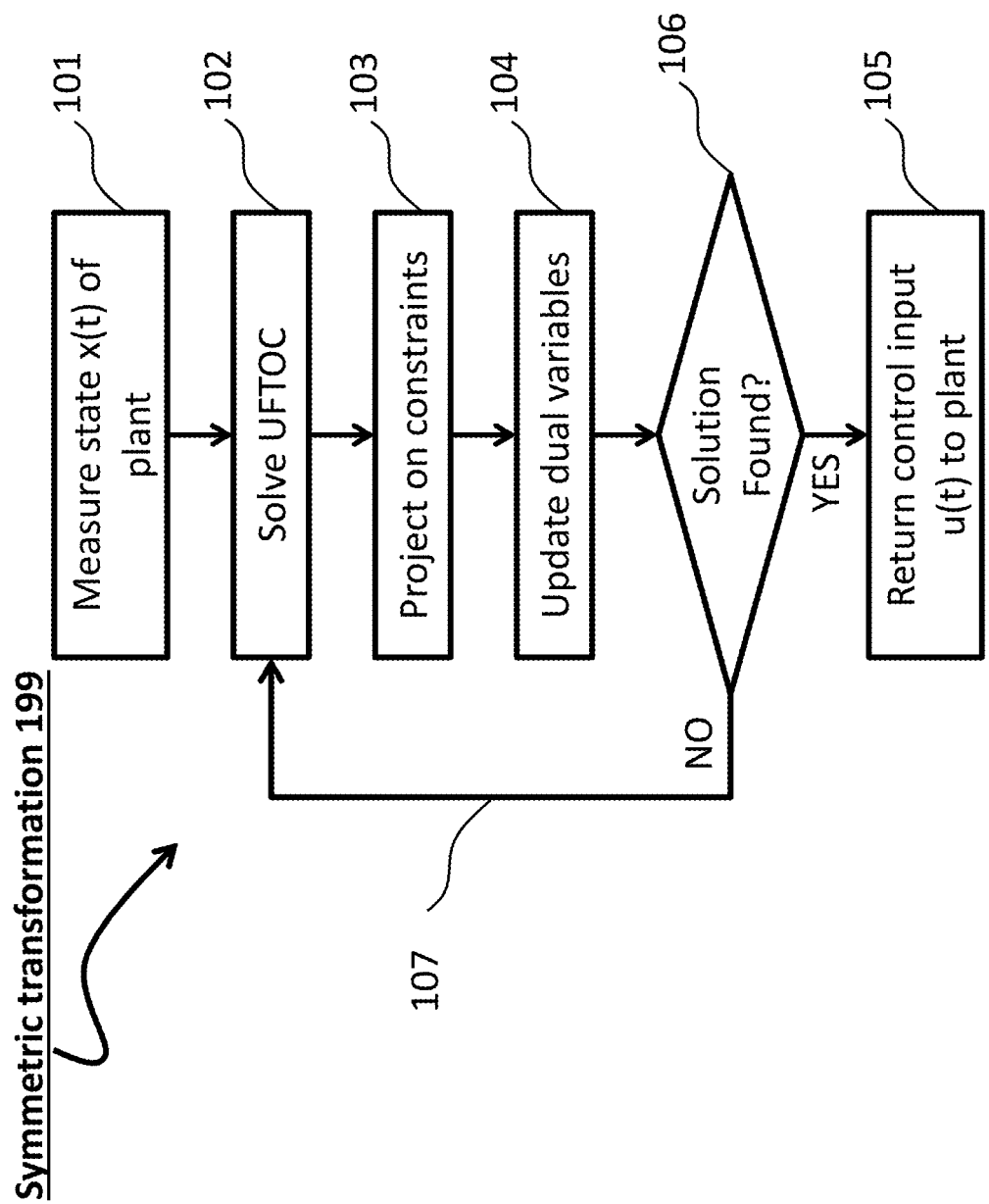
FIG. 1 shows a transformation of a baseline alternating direction method of multipliers according to some embodiments.

It is an object of some embodiments to solve the following constrained finite-time optimal control (CFTOC) problem $$\min \sum_{k=0}^{N} \begin{bmatrix} x_k \\ u_k \end{bmatrix}^T \begin{bmatrix} Q_k & S_k \\ S_k^T & R_k \end{bmatrix} \begin{bmatrix} x_k \\ u_k \end{bmatrix} \quad (1)$$

-continued $$\text{s.t. } x_{k+1} = A_k x_k + B_k u_k, x_0 = x(t) \quad (1b)$$

$$y_k = C_k x_k + D_k u_k \quad k = 0, \ldots, N \quad (1c)$$

$$\underline{y}_k \le y_k \le \overline{y}_k \quad k = 0, \ldots, N \quad (1d)$$

where $x_k$ is the predicted state over the horizon N under the control inputs $u_k$ initialized $x_0=x(t)$ at the current state $x(t)$ of the plant, i.e., the controlled machine. The predicted outputs $y_k$ are signals to be constrained (4) by the controller. In some embodiments, the parameters of the CFTOC of equation (1) are time-varying.

The CFTOC of equation (1) is a standard form for an optimal control problem provided to standardize the notation. Any optimal control problem with a quadratic cost and polytopic constraints can be expressed in the form of equation (1) using properly defined matrices C and D in the constrained-outputs (1c).

Some embodiments provide a symmetric transformation of baseline ADDM method. The baseline ADMM moves the equality constraints (1c) that define the constrained-outputs $y_k$ into the cost-function to produce the following augmented CFTOC $$\min \sum_{k=0}^{N} \begin{bmatrix} x_k \\ u_k \end{bmatrix}^T \begin{bmatrix} Q_k & S_k \\ S_k^T & R_k \end{bmatrix} \begin{bmatrix} x_k \\ u_k \end{bmatrix} \rho \| C_k x_k + D_k u_k - y_k - \gamma_k \|^2 \quad (2a)$$

$$\text{s.t. } x_{k+1} = A_k x_k + B_k u_k, x_0 = x(t) \quad (2b)$$

$$\underline{y}_k \le y_k \le \overline{y}_k \quad (2c)$$

where $\gamma_k$ for $k=0, \ldots, N-1$ are dual-variables that ensure the equality constraints (1c) hold at optimality and the step-size $\rho$ is a design parameter for the baseline ADMM.

FIG. 1 shows a transformation 199 of a baseline ADMM according to some embodiments. The baseline ADMM begins (101) by measuring or estimating the state of the system begin controlled. The baseline ADMM iterates (102), (103)-(104) to find an optimal solution to the CFTOC of equation (1). During each iteration, the baseline ADMM solves CFTOC with respect to three sets of decision variables; (102) the state $\{x_k\}_{k=0}^{N-1}$ and input $\{u_k\}_{k=0}^{N-1}$ trajectories, (103) the constrained output trajectory $\{y_k\}_{k=0}^{N-1}$ and (104) the dual variable trajectory $\{\gamma_k\}_{k=0}^{N-1}$.

With the constrained-outputs $\{y_k\}_{k=0}^{N-1}$ and dual-variables $\{\gamma_k\}_{k=0}^{N-1}$ fixed, the augmented optimal control problem (2) becomes the following unconstrained finite-time optimal control problem $$(x_k^+, u_k^+) = \underset{x_k, u_k}{\operatorname{argmin}} \sum_{k=0}^{N-1} \begin{bmatrix} x_k \\ u_k \end{bmatrix}^T \begin{bmatrix} Q & S \\ S^T & R \end{bmatrix} \begin{bmatrix} x_k \\ u_k \end{bmatrix} + \rho \| C x_k + D u_k - r_k \|^2 \quad (SP1)$$

$$\text{s.t. } x_{k+1} = A x_k + B u_k, x_0 = x(t)$$

where $r_k = y_k + \gamma_k$.

Sub-problem (SP1) trades-off tracking the unconstrained optimal with tracking a constraint satisfying reference $r_k = y_k + \gamma_k$. This sub-problem ( ) is solved in step (102) of the baseline algorithm. A solution of sub-problem (SP1) can be found using various optimal control techniques.

Next, the baseline ADMM solves (103) problem (2) with respect to the constrained-outputs $\{y_k\}_{k=0}^{N-1}$. This produces the following, time-decoupled, constraint-projection problems $$y_k^+ = \operatorname{argmin} \rho \| C x_k^+ + D u_k^+ - y_k - \gamma_k \|^2$$

$$\text{s.t. } \underline{y} \le \gamma_k \le \overline{y}$$

for $k = 0, \ldots, N$ which has the following closed-form solution $$3 y_k^+ = \operatorname{sat}(C x_k^+ + D u_k^+ - \gamma_k) \quad (SP2)$$

for $k=0, \ldots, N$ where $\operatorname{sat}(\bullet)$ is the saturation function $$\operatorname{sat}(y) = \begin{cases} y & \text{if } \underline{y} \le y \le \overline{y} \\ \underline{y} & \text{if } y < \underline{y} \\ \overline{y} & \text{if } y > \overline{y}. \end{cases}$$

Next, in each iteration, the baseline ADMM updates (104) the dual-variables using a gradient ascent $$\gamma_k^+ = \gamma_k + (C x_k^+ + D u_k^- - y_k^-) \quad (SP3)$$

for $k=0, \ldots, N$. The dual-variable update ( ) can be interpreted as integral-action for sub-problem (Sp1) i.e. the constraint violations $v_k = C x_k + D u_k - y_k$ are integrated (Sp3) by the dual-variables $\gamma_k$ until the reference $r_k = y_k + \gamma_k$ tracked in sub-problem (1) produces an output trajectory $y_k$ that satisfies constraints.

The baseline ADMM iterates until a solution has been found. The baseline ADMM determines (106) where a solution a solution has be found by testing whether the dual-variables $\|\gamma_k^+ - \gamma_k\| = \|C x_k + D u_k - \gamma_k\| < \varepsilon$ and the predicted constrained-outputs $\|y_k^+ - \gamma_k\| < \varepsilon$ have converged. If they have not converged (107) the baseline ADMM continues iterating. If they have converged (105) then the baseline ADMM returns the resulting control input u(t) which is implemented by the control system.

The baseline ADMM may fail to complete its iterations to find the optimal solution in real-time on an embedded compute with limit computational resources. This is especially true when the CFTOC of equation (1) has a large number of inputs, outputs, and states. Thus, there is a need for a system and method for reducing the computational cost of solving the CFTOC of equation (1). The most computationally expensive step in the baseline ADMM is solving the unconstrained optimal control problem (SP1). Some embodiments improve on the baseline ADMM by transforming 199 baseline ADMM signals into a symmetric domain to simplify the computation of solutions to the sub-problem (SP1). This symmetric transformation 199 uses symmetries in dynamics of the machine, a cost of the operation of the machine, and constraints on the operation of the machine to decompose the sub-problem (SP1).

Definition of Symmetry

Various embodiments solve CFTOCs that have patterns called symmetries. These patterns can be rigorously defined using linear-operators that map the CFTOC of equation (1) to itself. A symmetry of the CFTOC of equation (1) is defined as invertible transformations of the inputs, outputs, and states $\Theta_{u,y,x} \in \mathbb{R}^{n_{u,y,x} \times n_{u,y,x}}$ that preserve the dynamics $$\begin{bmatrix} \Theta_x & 0 \\ 0 & \Theta_y \end{bmatrix}^{-1} \begin{bmatrix} A & B \\ C & D \end{bmatrix} \begin{bmatrix} \Theta_x & 0 \\ 0 & \Theta_u \end{bmatrix} = \begin{bmatrix} A & B \\ C & D \end{bmatrix} \quad (3a)$$

and the cost function $$\begin{bmatrix} \Theta_x & 0 \\ 0 & \Theta_u \end{bmatrix}^{-1} \begin{bmatrix} Q & S \\ S^T & R \end{bmatrix} \begin{bmatrix} \Theta_x & 0 \\ 0 & \Theta_u \end{bmatrix} = \begin{bmatrix} Q & S \\ S^T & R \end{bmatrix}. \quad (3b)$$

For instance, a CFTOC is rotationally symmetric if definition (3) holds for some collection of rotation matrices $\Theta_{u,y,x}$.

Some embodiments solve CFTOCs with symmetries (3) of particular form $$\Theta_{y,u,x} = \begin{bmatrix} \Pi \otimes I_{n_{u,y,x}^1} & 0 \\ 0 & I_{n_{u,y,x}^{m+1}} \end{bmatrix} \quad (4)$$

for some m-dimensional permutation matrix $\Pi \in \mathbb{R}^{m \times m}$. Additionally, or alternatively, some embodiments solve SFTOCs with symmetries that can be transformed into the form (4) by either a linear or a nonlinear transformation.

Some embodiments apply to CFTOC of equation (1) where symmetries (3), i.e., 3a and 3b, are satisfied with matrices $\Theta_{u,y,x}$ of the form (4) for all permutation matrices $\Pi$. The set of all permutation matrices is called the symmetric group $\mathfrak{S}_m$. Thus, some embodiments apply to CFTOC (1) whose symmetry group is the symmetric group. The Kronecker product $\Pi \otimes I_{n_{u,y,x}^1}$ means that the symmetries can permute the state-space and cost-function matrices block-wise rather than the more restrictive element-wise permutations.

The symmetries (4) fix some of the variables for all $\Pi \in \mathfrak{S}_m$ due to the identity matrix $I_{n_{u,y,x}^{m+1}}$. The number of fixed variables n relative to the size m of the symmetric group $\mathfrak{S}_m$ provides a measure of the asymmetry of the CFTOC of equation (1), where $m n_{u,y,x}^1 + n_{u,y,x}^{m+1} = n_{u,y,x}$. This asymmetry influences the computational benefits of the embodiments.

Figure 2:
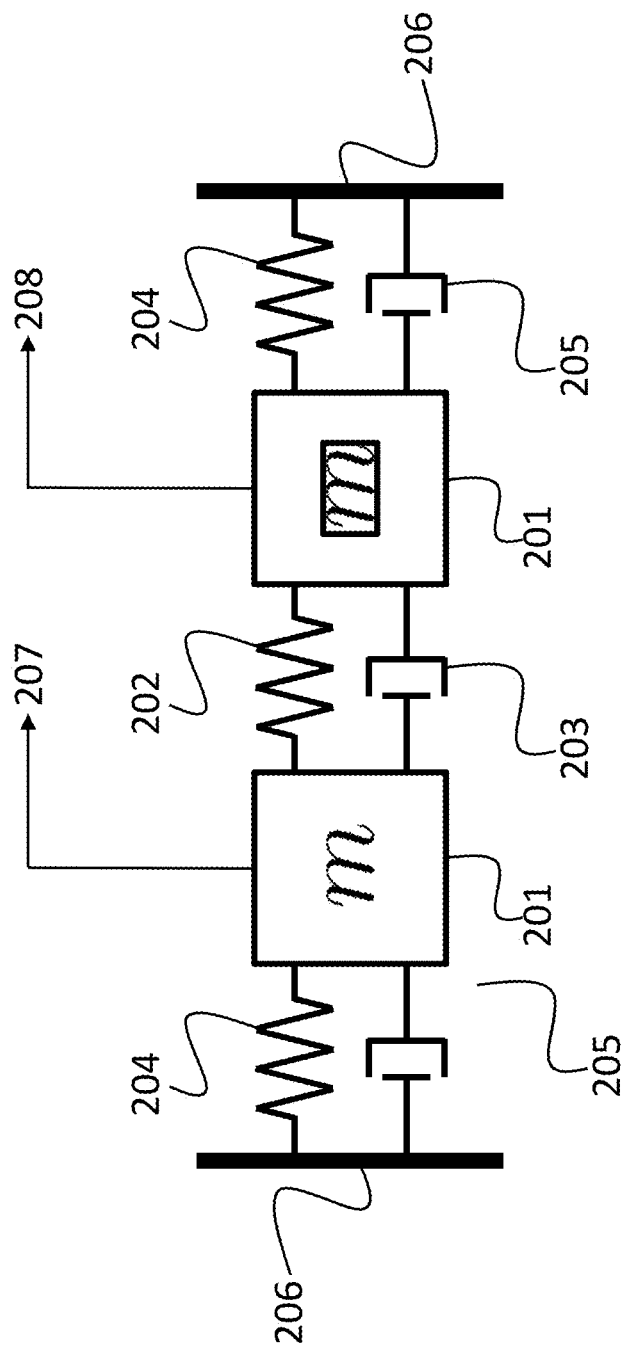
FIG. 2 shows a schematic of exemplar system with symmetric dynamics used by some embodiments to take advantage of the symmetry in control optimization.

FIG. 2 shows an example of a system with symmetric dynamics used by some embodiments. This example is included to clarify the definition of symmetry and does not restrict the systems for which this system applies.

The system in FIG. 2 includes two identical masses (201) connected by a spring (202) and damper (203). Each mass (201) is also connected to a wall (206) by identical springs (204) and dampers (203). The inputs are the forces $u_1(t)$ and $u_2(t)$ applied to the blocks in the directions (207) and (208) respectively. The outputs are the resulting positions $y_1(t)$ and $y_2(t)$ of the blocks in the directions (207) and (208) respectively. For simplicity of the example we will assume that the springs (202) and (204) have the same coefficient k and the dampers (203) and (205) have the same coefficient b.

The dynamics of the system in FIG. 2 are modeled the state-space equations $$\frac{d}{dt}\begin{bmatrix} y_1 \\ y_2 \\ \dot{y}_1 \\ \dot{y}_2 \end{bmatrix} = \underbrace{\begin{bmatrix} 0 & 1 & 0 & 0 \\ -\frac{2k}{m} & -\frac{2b}{m} & \frac{k}{m} & \frac{b}{m} \\ 0 & 0 & 0 & 1 \\ \frac{k}{m} & \frac{b}{m} & -\frac{2k}{m} & -\frac{2b}{m} \end{bmatrix}}_{A} \begin{bmatrix} y_1 \\ y_2 \\ \dot{y}_1 \\ \dot{y}_2 \end{bmatrix} + \underbrace{\begin{bmatrix} 0 & 0 \\ \frac{1}{m} & 0 \\ 0 & 0 \\ 0 & \frac{1}{m} \end{bmatrix}}_{B} \begin{bmatrix} u_1 \\ u_2 \end{bmatrix} \quad (5a)$$

$$\begin{bmatrix} y_1 \\ y_2 \end{bmatrix} = \underbrace{\begin{bmatrix} 1 & 0 & 0 & 0 \\ 0 & 0 & 1 & 0 \end{bmatrix}}_{C} \begin{bmatrix} y_1 \\ y_2 \\ \dot{y}_1 \\ \dot{y}_2 \end{bmatrix} + \underbrace{\begin{bmatrix} 0 & 0 \\ 0 & 0 \end{bmatrix}}_{D} \begin{bmatrix} u_1 \\ u_2 \end{bmatrix} \quad (5b)$$

The system in FIG. 2 is visually reflectively symmetric i.e. horizontally reflecting does not change the diagram. Thus, a symmetry group for this system is the symmetric-2 group $\mathfrak{S}_2$ which has two elements; the 2×2 identity matrix $I_2$ and the permutation matrix $$\Pi = \begin{bmatrix} 0 & 1 \\ 1 & 0 \end{bmatrix} \quad (6)$$

The symmetries (10) of the dynamics (5.2) are $$\Theta_u = \Theta_y = \Pi \otimes I_1 = \begin{bmatrix} 0 & 1 \\ 1 & 0 \end{bmatrix} \quad (7a)$$

$$\Theta_x = \Pi \otimes I_2 = \begin{bmatrix} 0 & 0 & 1 & 0 \\ 0 & 0 & 0 & 1 \\ 1 & 0 & 0 & 0 \\ 0 & 1 & 0 & 0 \end{bmatrix} \quad (7b)$$

where $I_{n_u=n_y}=1$ are scalar identity matrices (i.e. the number one) and $I_{n_x} \in \mathbb{R}^{2 \times 2}$ is a 2×2 identity matrix. This is because each block has 1 input/output and 2 states.

It can be verified that these symmetries satisfy (3), i.e.

$$\underbrace{\begin{bmatrix} 0 & 0 & 1 & 0 \\ 0 & 0 & 0 & 1 \\ 1 & 0 & 0 & 0 \\ 0 & 1 & 0 & 0 \end{bmatrix}}_{\Theta_x^{-1}} \underbrace{\begin{bmatrix} 0 & 1 & 0 & 0 \\ -\frac{2k}{m} & -\frac{2b}{m} & \frac{k}{m} & \frac{b}{m} \\ 0 & 0 & 0 & 1 \\ \frac{k}{m} & \frac{b}{m} & -\frac{2k}{m} & -\frac{2b}{m} \end{bmatrix}}_{A} \underbrace{\begin{bmatrix} 0 & 0 & 1 & 0 \\ 0 & 0 & 0 & 1 \\ 1 & 0 & 0 & 0 \\ 0 & 1 & 0 & 0 \end{bmatrix}}_{\Theta_x} =$$

$$\underbrace{\begin{bmatrix} 0 & 1 & 0 & 0 \\ -\frac{2k}{m} & -\frac{2b}{m} & \frac{k}{m} & \frac{b}{m} \\ 0 & 0 & 0 & 1 \\ \frac{k}{m} & \frac{b}{m} & -\frac{2k}{m} & -\frac{2b}{m} \end{bmatrix}}_{A}$$

-continued $$\underbrace{\begin{bmatrix} 0 & 0 & 1 & 0 \\ 0 & 0 & 0 & 1 \\ 1 & 0 & 0 & 0 \\ 0 & 1 & 0 & 0 \end{bmatrix}}_{\Theta_x^{-1}} \underbrace{\begin{bmatrix} 0 & 0 \\ \frac{1}{m} & 0 \\ 0 & 0 \\ 0 & \frac{1}{m} \end{bmatrix}}_{B} \underbrace{\begin{bmatrix} 0 & 1 \\ 1 & 0 \end{bmatrix}}_{\Theta_u} = \underbrace{\begin{bmatrix} 0 & 0 \\ \frac{1}{m} & 0 \\ 0 & 0 \\ 0 & \frac{1}{m} \end{bmatrix}}_{B}$$

$$\underbrace{\begin{bmatrix} 0 & 1 \\ 1 & 0 \end{bmatrix}}_{\Theta_y^{-1}} \underbrace{\begin{bmatrix} 1 & 0 & 0 & 0 \\ 0 & 0 & 1 & 0 \end{bmatrix}}_{C} \underbrace{\begin{bmatrix} 0 & 0 & 1 & 0 \\ 0 & 0 & 0 & 1 \\ 1 & 0 & 0 & 0 \\ 0 & 1 & 0 & 0 \end{bmatrix}}_{\Theta_x} = \underbrace{\begin{bmatrix} 1 & 0 & 0 & 0 \\ 0 & 0 & 1 & 0 \end{bmatrix}}_{C}$$

$$\underbrace{\begin{bmatrix} 0 & 1 \\ 1 & 0 \end{bmatrix}}_{\Theta_y^{-1}} \underbrace{\begin{bmatrix} 0 & 0 \\ 0 & 0 \end{bmatrix}}_{D} \underbrace{\begin{bmatrix} 0 & 1 \\ 1 & 0 \end{bmatrix}}_{\Theta_u} = \underbrace{\begin{bmatrix} 0 & 0 \\ 0 & 0 \end{bmatrix}}_{D}$$

Thus, symmetry (3) provides a mathematically rigorous method for describing the visual symmetry observed in the system shown in FIG. 2.

Figure 3:
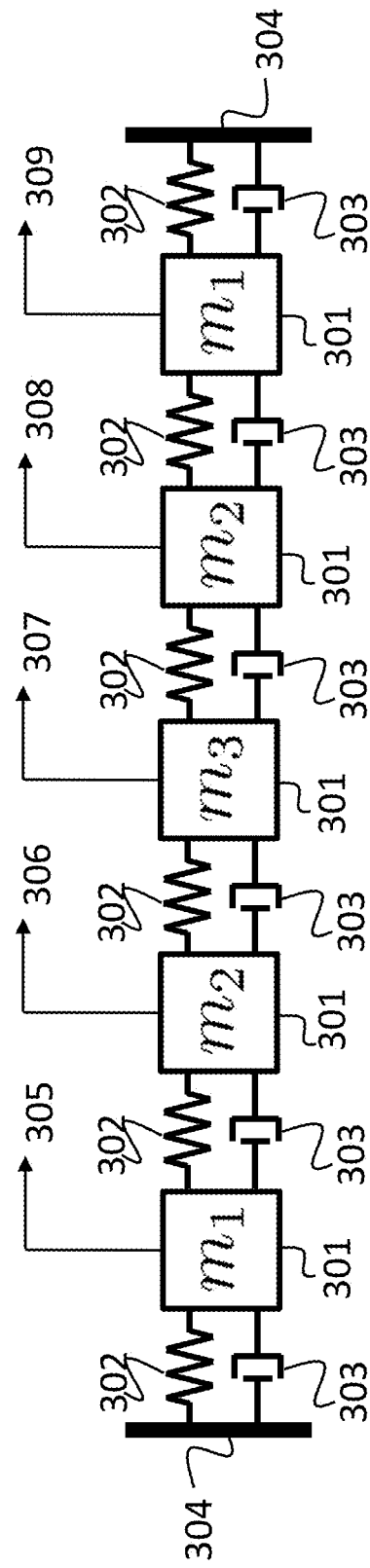
FIG. 3 shows a schematic of another system with symmetric dynamics used by some embodiments to take advantage of the symmetry in control optimization.

FIG. 3 shows another example of a similar system with five identical masses (301) connected by springs (302) and dampers (303). This system is also reflectively symmetric. Therefore it has the same symmetry group $\mathfrak{S}_2$ which contains the identity matrix $I_2$ and the permutation matrix (6). However, the symmetries (10) of the system in FIG. 3 are different than the symmetries of the system in FIG. 2 since these systems have different numbers of inputs, outputs, and states that must be permuted. The symmetries of the system in FIG. 3 are $$\Theta_u = \Theta_y = \begin{bmatrix} \Pi \otimes I_2 & 0 \\ 0 & I_1 \end{bmatrix} \quad (8a)$$

$$\Theta_x = \begin{bmatrix} \Pi \otimes I_4 & 0 \\ 0 & I_2 \end{bmatrix}, \quad (8b)$$

where $I_2$ and $I_4$ are 2×2 and 4×4 identity matrices respectively. The symmetries $\Theta_u$ ($\Theta_y$) in (5.2) switch the forces (position) of the left 2 blocks to the forces (position) of the right 2 blocks. The force (position) of the center block is mapped to itself (i.e. it is fixed by the reflection) which is why $\Theta_u$ ($\Theta_y$) in (8) has a fixed-space.

Symmetric Transformation and Decomposition

Some embodiments are based on the realization that the dynamics and costs of symmetric CFTOCs can be decomposed into smaller simpler subsystems and sub-costs.

In some implementations, the symmetric decomposition is essentially a singular value decomposition (SVD) shared by each of the state-space and cost-function matrices. The symmetric decomposition finds orthogonal transformations of the inputs, outputs, and states $\Phi_{u,y,x} \in \mathbb{R}^{n_{u,y,x} \times n_{u,y,x}}$ that decompose the dynamics $$\begin{bmatrix} \Phi_x^i & 0 \\ 0 & \Phi_y^i \end{bmatrix}^T \begin{bmatrix} A & B \\ C & D \end{bmatrix} \begin{bmatrix} \Phi_x^j & 0 \\ 0 & \Phi_u^j \end{bmatrix} = \left( \begin{bmatrix} \hat{A}^{ii} & \hat{B}^{ii} \\ \hat{C}^{ii} & \hat{D}^{ii} \end{bmatrix} \text{ if } i = j \right. \quad (9a)$$
$$\left. 0 \quad \text{if } i \neq j \right.$$

and the cost function $$\begin{bmatrix} \Phi_x^i & 0 \\ 0 & \Phi_u^i \end{bmatrix}^T \begin{bmatrix} Q & S \\ S^T & R \end{bmatrix} \begin{bmatrix} \Phi_x^j & 0 \\ 0 & \Phi_u^j \end{bmatrix} = \left( \begin{bmatrix} \hat{Q}^{ii} & \hat{S}^{ii} \\ \hat{S}^{iiT} & \hat{R}^{ii} \end{bmatrix} \text{ if } i = j \right. \quad (9b)$$
$$\left. 0 \quad \text{if } i \neq j \right.$$

where $\hat{A}^{ii} = \Phi_x^{iT} A \Phi_x^i \in \mathbb{R}^{n_x^i \times n_x^i}$ and likewise for each of the other dynamics and cost matrices. The tall-matrix $\Phi_{u,y,x}^i \in \mathbb{R}^{n_{u,y,x}^i \times n_{u,y,x}^i}$ contains a sub-set of the columns of the transformations $\Phi_{u,y,x} \in \mathbb{R}^{n_{u,y,x} \times n_{u,y,x}}$ that defines the i-th channel Unlike a traditional, the channels of the symmetric decomposition are defined by multiple column-vectors and the singular values (9) are blocks rather than scalars. Throughout this disclosure we will use the hat-notation $\hat{\bullet}$ to denote variables and problems represented in the symmetry adapted basis $\Phi_{u,y,x}$.

Some embodiments apply to CFTOCs with a specific symmetry group, the symmetric group $\mathfrak{S}_m$. For the symmetric group $\mathfrak{S}_m$ with symmetries of the form (4), the symmetric transformations have the form $$\Phi_{u,y,x} = \begin{bmatrix} \Phi \otimes I_{n_{u,y,x}^1} & 0 \\ 0 & I_{n_{u,y,x}^{m+1}} \end{bmatrix} \quad (10)$$

where the dimensions $n_{u,y,x}^1$ and $n_{u,y,x}^{m+1}$ match those in (10) and $$\Phi = \begin{bmatrix} 1 & 1 & 1 & \cdots & & 1 \\ -1 & 1 & 1 & \cdots & & 1 \\ & -2 & 1 & \cdots & & 1 \\ & & \ddots & \ddots & & \vdots \\ & & & & -m+1 & 1 \end{bmatrix} \Lambda \in \mathbb{R}^{m \times m}, \quad (11)$$

where $\Lambda \in \mathbb{R}^{m \times m}$ is a diagonal matrix, with elements $\lambda_{ii} = 1/\sqrt{i^2 + i}$ for $i=1, \ldots, m-1$ and $\lambda_{mm} = 1/\sqrt{m}$, that ensures that the column-vectors of (I) are unit-vectors. The structure of the transformations (11) plays an important role in the computational benefits of the invention. Equation (11) is an example of one symmetric transformation that decomposes a system that is symmetric with respect to the symmetric group $\mathfrak{S}_m$. This invention encompasses all such symmetric transformations.

Notably, Equation (11) shows that the symmetric transformation of some embodiments includes a matrix transformation of a difference between an upper triangular matrix of ones and a super-diagonal matrix of sequentially descending numbers, wherein the size of the lower triangular matrix and the size of the super-diagonal matrix equal the size of the symmetries of the machine.

For the symmetric group $\mathfrak{S}_m$, the generic decomposition (9) of the dynamics and cost matrices has additional structure, namely that first m−1 subsystems and sub-costs are identical $$\begin{bmatrix} \hat{A}^{ii} & \hat{B}^{ii} \\ \hat{C}^{ii} & \hat{D}^{ii} \end{bmatrix} = \begin{bmatrix} \hat{A}^{11} & \hat{B}^{11} \\ \hat{C}^{11} & \hat{D}^{11} \end{bmatrix} \quad (12a)$$

$$\begin{bmatrix} \hat{Q}^{ii} & \hat{S}^{ii} \\ \hat{S}^{iiT} & \hat{R}^{ii} \end{bmatrix} = \begin{bmatrix} \hat{Q}^{11} & \hat{S}^{11} \\ \hat{S}^{11T} & \hat{R}^{11} \end{bmatrix} \quad (12b)$$

for i=1, . . . , m−1. The fixed dynamics i=m are different and typically have a different input, output, and state dimensions $n_{u,y,x}^1 \neq n_{u,y,x}^1 + n_{u,y,x}^{m+1}$. The explicit repetition (12) of problem-data is used by some embodiments to reduce the memory required by the invention.

In order to clarify the symmetric decomposition, the symmetric decomposition is explained for the system in FIG. 2. As previously noted, a symmetry group for the system in FIG. 2 is the symmetric-2 group $\mathfrak{S}_2$ which contains the permutation matrix (6). The symmetries $\Theta_u$, $\Theta_y$, and $\Theta_x$ are given in (13). Thus, the symmetric decomposition matrices (10) are given by $$\Phi_u = \Phi_y = I_1 \otimes \Phi = \begin{bmatrix} 1 & 1 \\ -1 & 1 \end{bmatrix} \quad (13a)$$

$$\Phi_x = I_2 \otimes \Phi = \begin{bmatrix} 1 & 1 & 0 & 0 \\ -1 & 1 & 0 & 0 \\ 0 & 0 & 1 & 1 \\ 0 & 0 & -1 & 1 \end{bmatrix} \quad (13b)$$

where the symmetry group $\mathfrak{S}_2$ has size 2 and the matrix $\Phi$ is given by (11)

$$\Phi = \begin{bmatrix} 1 & 1 \\ -1 & 1 \end{bmatrix}. \quad (14)$$

Applying (9) the symmetric decomposition matrices (13) to the dynamics (5) produces the decoupled dynamics $$\frac{d}{dt}\begin{bmatrix} y_1 - y_2 \\ \dot{y}_1 - \dot{y}_2 \\ y_1 + y_2 \\ \dot{y}_1 + \dot{y}_2 \end{bmatrix} = \underbrace{\begin{bmatrix} 0 & 1 & 0 & 0 \\ -\frac{3k}{m} & -\frac{3b}{m} & 0 & 0 \\ 0 & 0 & 0 & 1 \\ 0 & 0 & -\frac{k}{m} & -\frac{b}{m} \end{bmatrix}}_{\hat{A}} \underbrace{\begin{bmatrix} y_1 - y_2 \\ \dot{y}_1 - \dot{y}_2 \\ y_1 + y_2 \\ \dot{y}_1 + \dot{y}_2 \end{bmatrix}}_{\hat{x}} + \underbrace{\begin{bmatrix} 0 & 0 \\ \frac{1}{m} & 0 \\ 0 & 0 \\ 0 & \frac{1}{m} \end{bmatrix}}_{\hat{B}} \begin{bmatrix} u_1 - u_2 \\ u_1 + u_2 \end{bmatrix} \quad (15a)$$

$$\underbrace{\begin{bmatrix} y_1 - y_2 \\ y_1 + y_2 \end{bmatrix}}_{\hat{y}} = \underbrace{\begin{bmatrix} 1 & 0 & 0 & 0 \\ 0 & 0 & 1 & 0 \end{bmatrix}}_{\hat{C}} \begin{bmatrix} y_1 \\ y_2 \\ \dot{y}_1 \\ \dot{y}_2 \end{bmatrix} + \underbrace{\begin{bmatrix} 0 & 0 \\ 0 & 0 \end{bmatrix}}_{\hat{D}} \underbrace{\begin{bmatrix} u_1 - u_2 \\ u_1 + u_2 \end{bmatrix}}_{\hat{u}} \quad (15b)$$

where $$\hat{A}_{11} = \begin{bmatrix} 0 & 1 \\ -\frac{3k}{m} & -\frac{3b}{m} \end{bmatrix} \hat{A}_{22} = \begin{bmatrix} 0 & 1 \\ -\frac{k}{m} & -\frac{b}{m} \end{bmatrix}$$

$$\hat{B}_{11} = \begin{bmatrix} 0 \\ \frac{1}{m} \end{bmatrix} \hat{B}_{22} = \begin{bmatrix} 0 \\ \frac{1}{m} \end{bmatrix}$$

$$\hat{C}_{11} = [1 \; 0] \hat{C}_{22} = \begin{bmatrix} 1 \\ 0 \end{bmatrix}$$

$$\hat{D}_{11} = 0 \hat{D}_{22} = 0$$

The symmetric decomposition of the system shown in FIG. 2 splits the dynamics (5) from a single system with $n_u=n_y=2$ inputs and outputs, and $n_x=4$ states into two decoupled systems with $\hat{n}_u^1=\hat{n}_u^2=\hat{n}_y^1=\hat{n}_y^2=1$ input/output, and $\hat{n}_x^1=\hat{n}_x^2=2$ states. The input of the first subsystem is the out-of-phase force $\hat{u}_1=u_1-u_2$ applied to the blocks and the output is the out-of-phase motion $\hat{y}_1=y_1-y_2$ of the blocks. The input of the second subsystem is the in-phase force $\hat{u}_2=u_1+u_2$ and the output is the in-phase motion $\hat{y}_2=y_1+y_2$. For this example, the symmetric decomposition works since the in-phase and out-of-phase motions of the blocks are decoupled.

The symmetry (8) of the 5 mass system shown in FIG. 3 can also be decomposed its dynamics. The symmetric decomposition splits the original systems with $n_u=n_y=5$ inputs/outputs, and $n_x=10$ states into m=2 subsystems. The first subsystem models the out-of-phase motion and has $\hat{n}_u^1=\hat{n}_y^1=2$ inputs/outputs and $\hat{n}_x^1=4$ states. The inputs (outputs) are the out-of-phase force (position) $u_1-u_5$ ($y_1-y_5$) on blocks 1 and 5, and the out-of-phase force (position) $u_2-u_4$ ($y_1-y_5$) on blocks 2 and 4. The second subsystem models the in-phase motion along with the motion of the center block and has $\hat{n}_u^2=\hat{n}_y^2=3$ inputs and outputs, and $\hat{n}_x^2=6$ states. The inputs (outputs) are the in-phase force (position) $u_1+u_5$ ($y_1+y_5$) on blocks 1 and 5, the in-phase force (position) $u_2+u_4$ ($y_1+y_5$) on blocks 2 and 4, and finally the force (position) $u_3$ ($y_3$) on block 3.

Symmetric ADMM

Figure 4:
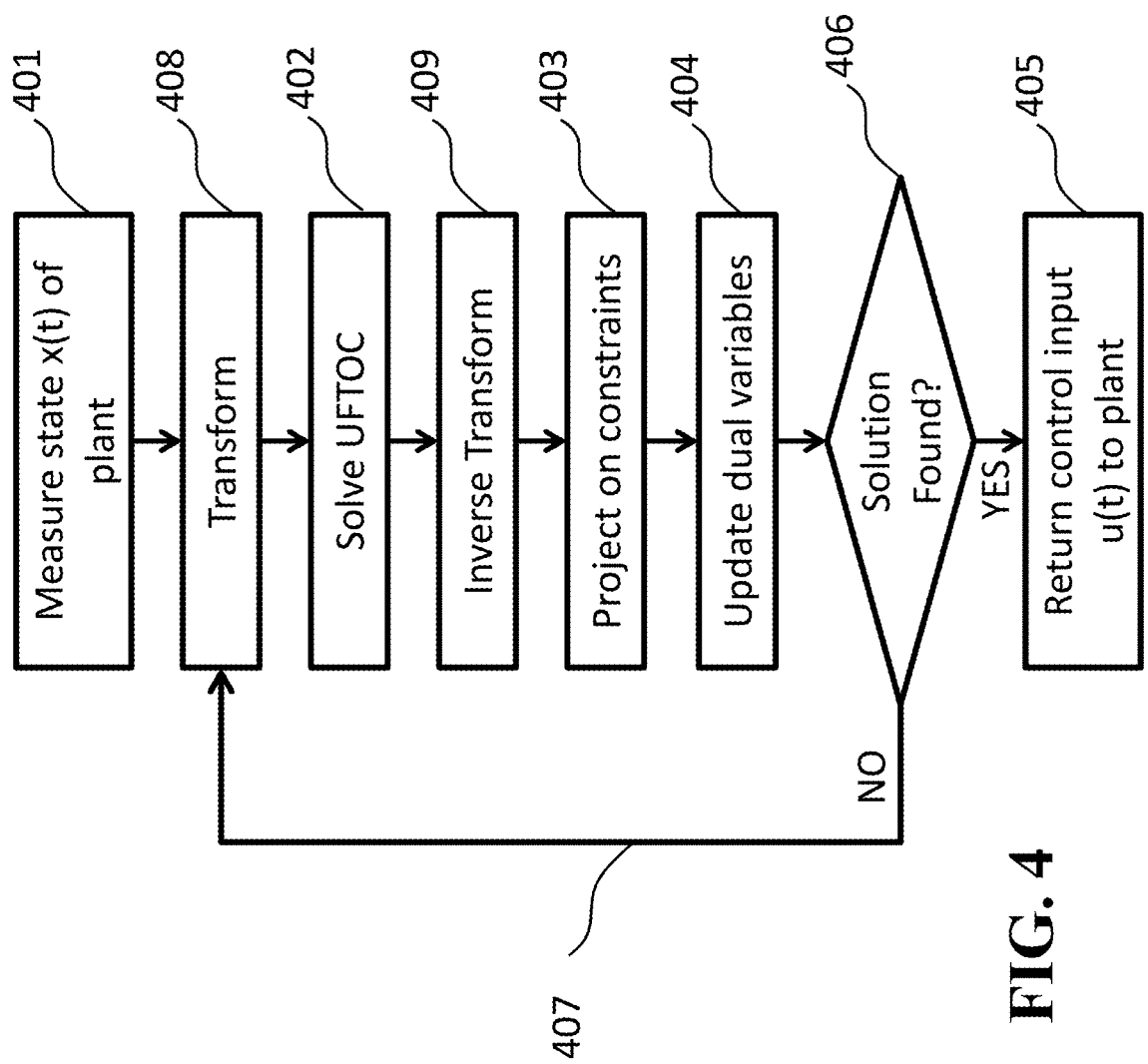
FIG. 4 shows a flow chart of a method for computing optimal control input according to some embodiments.

FIG. 4 shows a flow chart of a method for computing optimal control input according to one embodiment to provide a system and a method for solving CFTOCs (1) whose symmetry group is the symmetric group $\mathfrak{S}_m$. As in the baseline ADMM, the embodiment first measures (or estimates) the state of the system (401). In the main iteration, the embodiment repeatedly solves three sub-problems (402), (403)-(404). However, in contrast with baseline ADMM, the symmetric ADMM solves the sub-problem (SP1) in the symmetric domain (402). This is accomplished by transforming into the symmetric domain (408) then solving the sub-problem (402) and then inverse-transforming into the original domain (409).

Using the symmetric decomposition (9), the unconstrained optimal control problem (SP1) can be decomposed into m decoupled sub-problems $$3 \min_{\hat{x}_k^i, \hat{u}_k^i} \sum_{k=0}^{N-1} \begin{bmatrix} \hat{x}_k^i \\ \hat{u}_k^i \end{bmatrix}^T \begin{bmatrix} \hat{Q}^{ii} & \hat{S}^{ii} \\ \hat{S}^{iiT} & \hat{R}^{ii} \end{bmatrix} \begin{bmatrix} \hat{x}_k^i \\ \hat{u}_k^i \end{bmatrix} + \rho \|\hat{C}^{ii}\hat{x}_k^i + \hat{D}^{ii}\hat{u}_k^i - \hat{r}_k^i\|^2 \quad (\text{S}\hat{\;}\text{P1})$$

$$\text{s.t. } \hat{x}_{k+1}^i = \hat{A}^{ii}\hat{x}_k^i + \hat{B}^{ii}\hat{u}_k^i, \hat{x}_0^i = \hat{x}^i(t)\mathbf{1}$$

for i=1, ..., m where $\hat{x}^i(t) = \Phi_x^{iT} x(t)$ and $\hat{r}_k^i = \Phi_y^{iT} r_k$ are the i-th components of the initial state x(t) and reference $r_k$ in the symmetric domain.

However, one embodiment solves the constraint-projection problems (SP2) in the original domain, since transforming simple constraints (1d) into the symmetric domain can complicate the constraints.

In some embodiments, the dual-variable are updated in the original domain (SP3). In other embodiments, the dual-variable are updated in the symmetric domain $$3\hat{\gamma}_k^{i+} = \hat{\gamma}_k^i + \hat{C}^{ii}\hat{x}_k^i + \hat{D}^{ii}\hat{u}_k^i - \hat{y}_k^{i+} \quad (\text{S}\hat{\;}\text{P3})$$

Updating the dual-variables in the symmetric domain (S^P3) provides a computational benefit which is typically minuscule since the since the dual-variable updates (SP3) are already very inexpensive to solve.

The main iteration (402)-(404) is repeated until a solution is found. Some embodiments determine where a solution a solution has be found by testing whether the dual-variables $\|\gamma_k^+ - \gamma_k\| = \|Cx_k + Du_k - y_k\| < \varepsilon$ and the predicted constrained-outputs $\|y_k^+ - y_k\| < \varepsilon$ have converged (406). In some embodiments of this invention, this check can be done in the symmetric domain. If they have not converged (407) the invention continues iterating. If they have converged (405) then the invention returns the resulting control input $u(t) = \Phi^* \hat{u}_0$ which is implemented by the control system. The control input u(t) must be returned in the original domain.

Solving the sub-problem (SP1) in the symmetric domain (S^P1) does not change the number of iterations required to find the optimal control input. The advantage of embodiments is that each iteration requires less computation to complete. The baseline ADMM requires $O(Nn^2)$ where $n = \max\{n_{x,u,y}\}$ operations to solve the subproblem (SP1). In some embodiments, the m decomposed sub-problems (S^P1) are solved on a single processor. This requires $O(N(mn_1^2 + n_{m+1}^2))$ operations by the single processor. Thus, this embodiment is approximately m times faster than the baseline ADMM.

In many applications, the number of processors grows with the size m of the symmetry group $\mathfrak{S}_m$. Thus, some embodiments of this invention solve the m decomposed subproblems (sp) in parallel on m processors. This requires $O(N(n_1 + n_{m+1})^2)$ operations per processor. Thus, this invention is approximately $m^2$ times faster than the baseline algorithm. In fact, the computational cost of solving subproblems (sp) in parallel remains constant regardless of the problem size. This is a reasonable since symmetry allows us to efficiently use parallel computationally resource which we assume are growing with problem size.

Notably, the embodiments use additional computation to transform the signals of the controlled machine into the symmetric domain (408) and inverse-transform to the original domain (409). However, in some implementations, the computational savings provided by the m decomposed sub-problems (S^P1) instead of the original subproblem (SP1) are greater than the additional computational cost of transforming between domains. It is non-obvious that this is the case since the applying the transformations $\Phi_y$ for k=0, ..., N using generic matrix-vector multiplication has complexity $O(Nn_y^2)$. Since typically the number of constrained-outputs $n_y \geq n_x + n_u$ is larger than the number of states $n_x$ and inputs $n_u$, this would increase the computational cost of this invention over the baseline algorithm. However, some embodiments are based on the realization that the transformation (408) and inverse-transformation (409) can be computed linearly.

Figure 5:
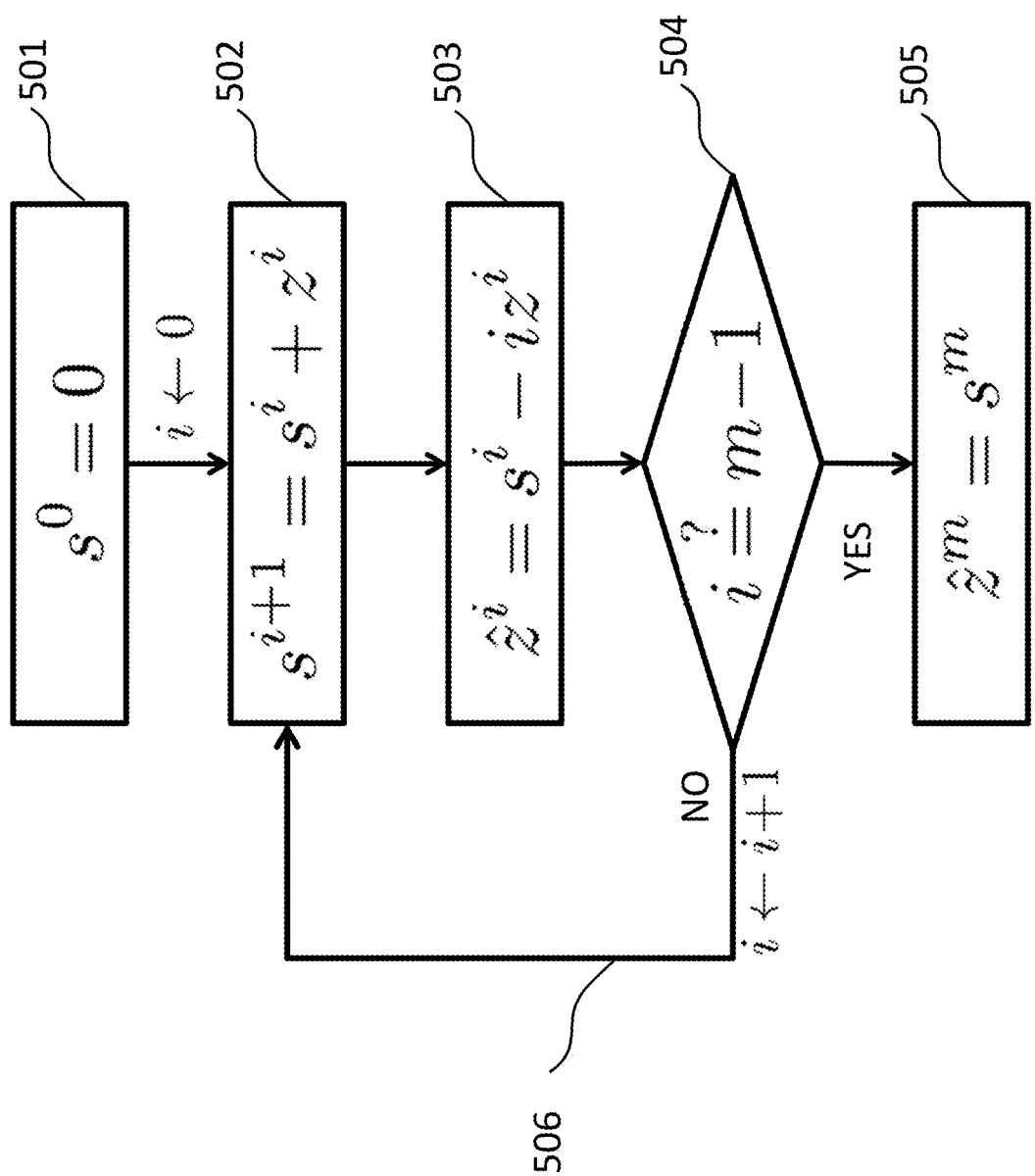
FIG. 5 shows a flow chart of a method for transforming a vector from the original domain into the symmetric domain according to some embodiments.

FIG. 5 shows a flow chart of a method for linear transformation from the original domain into the symmetric domain according to some embodiments. The method iteratively transforms $\hat{z} = \Phi^T z$ elements of a vector z based on a scaled difference $\hat{z}^i = \lambda_{ii}(s^i - iz^{i+1})$ between a running-sum $s^i$ of a current element $z^i$ of the vector z and the next element $z^{i+1}$ of the vector z.

Specifically, in each iteration (502)-(503), the method computes a running-sum $s_i = \sum_{j=1}^{i} z^j$ of the elements $z^i$ of the vector $z \in \mathbb{R}^m$ where $s^0 = 0$ (501). In the i-th iteration, the algorithm computes the i-th component $\hat{z}^i$ of the transformed vector $\hat{z} = \Phi^T z$ (503). The i-th component $\hat{z}^i$ of the transformed vector $\hat{z} = \Phi^T z$ is the scaled difference $\hat{z}^i = \lambda_{ii}(s^i - iz^{i+1})$ between the running-sum $s^i$ and the next element $z^{i+1}$ of the original vector z where $\lambda_{ii} = 1/\sqrt{i^2 + i}$. The method computes m 1 iteration (504) after each iteration the index i is updated (501). The final element $\hat{z}^m = \lambda_{mm} s^m$ of the transformed vector $\hat{z} = \Phi^T z$ is given by the total running-sum $x_m = \sum_{j=1}^{m} z^j$ normalized by $\lambda_{mm} = 1/\hat{m}$ (505). The inverse-transformation can be computed by reversing the method shown in FIG. 5.

Since the method in FIG. 5 only computes running sums $s_i = \sum_{j=1}^{i} z^j$ its computational complexity is linear in the size m of the symmetry group $\mathfrak{S}_m$. Thus, the computational cost of transforming between domains is insignificant in comparison to the computational benefits provided by solving the m decoupled subproblem (S^P1) making various embodiments efficient. In contrast, generic decomposition methods, such as eigenvalue decomposition or singular value decomposition, do not have this property and therefore would not provide the computational benefits.

Memory Benefits

One embodiment is applied to large-scale $n_{u,y,x} \gg 1$ problems (1) with a lot of symmetry $m \gg 1$. For large-scale problems, storing the problem-data in memory on an embedded platform can be nonviable. In addition, the computational benefits provided by this invention are often so drastic that the computational bottleneck becomes accessing memory rather than performing the computations. Thus, there is a need for a system and method for reducing the amount of memory required to solve the CFTOC (1).

Equation (12) demonstrates that the amount of read-only memory used by this invention is constant regardless of the problem size $n = mn_1 + n_{m+1}$ where $n_1$ and $n_{m+1}$ are fixed. This reflects the intuition that the memory required to describe the CFTOC (1) does not increase due to repetition in the system. For example, adding another identical cell to a battery pack or another indoor unit to a system does not increase the amount of memory needed by the symmetric ADMM. Note that the memory needed to store the system signals (inputs $u_k$, outputs $y_k$, states $x_k$, and dual-variables $\gamma_k$) stills grows with problem size $n_{u,y,x} = mn_{u,y,x}^1 + n_{u,y,x}^{m+1}$. But, the memory required for the time-varying signals is typically insignificant compared to the static memory needs to describe the system dynamics and cost i.e. masses, lengths, volumes, resistances, capacitances of every component in the system.

Application: Battery Balancing

One example of an application for this invention is the implementation of a model predictive controller for battery balancing. The objective of the battery balancing problem is to redistribute charge in a battery of m cells so that every cell has the same state-of-charge. Model Predictive Control (MPC) is used to achieve fast and energy-efficient balancing. This problem is computationally challenging for large-scale m>>1 battery packs, but also very symmetric.

The battery cell dynamics (1b) are modeled as integrators where $A=I \in \mathbb{R}^m$ and $B \in \mathbb{R}^{m \times m}$ describes the balancing circuit topology. The state $x(t) \in \mathbb{R}^m$ is the state-of-charge of each cell and u(t) is the balancing current. There are constraints on the minimum $\underline{x}$ and maximum $\bar{x}$ state-of-charge for each cell. In addition, the balancing circuit can only draw charge from a single cell at a time resulting in the 1-norm ball constraint $\|u(t)\|_1 \le 1$. These state and input constraints can be expressed as 4m+1 constraints of the form (3) and (4) using the standard trick of splitting the input $u(t)=u^+(t)-u^-(t)$ into positive and negative $u^+(t)$, $u^-(t) \ge 0$ components with $\Sigma_{i=1}^m u_i^+(t)+u_i^-(t) \le 1$. The cost-function (1) penalizes the cell imbalance and usage of balancing current where $Q=I-1/m11^T \in \mathbb{R}^{m \times m}$, $R=rI \in \mathbb{R}^{2m \times 2m}$, and $S=0 \in \mathbb{R}^{m \times 2m}$. In one implementation, the CFTOC (1) is solved every 1 minute with a prediction horizon of 10 minutes.

Intuitively, this problem is symmetric since the battery cells are nearly identical and they are each connected to the balancing circuit in the same manner. Numerically, the symmetry can be easily verified that the resulting CFTOC (1) is invariant (3) under the symmetric group (4) where $(n_x^1, n_x^{m+1})=(1,0)$, $(n_u^1, n_u^{m+1})=(2,0)$, and $(n_y^1, n_y^{m+1})=(4,1)$. Note that only the constraints have a non-trivial fixed-space $n_y^{m+1}=1>0$. This fixed-space is a result of the constraint $\Sigma_{i=1}^m u_i^-(t)+u_i^-(t) \le 1$ on the total balancing current i.e. permuting the balancing currents does not change their sum.

Figure 6:
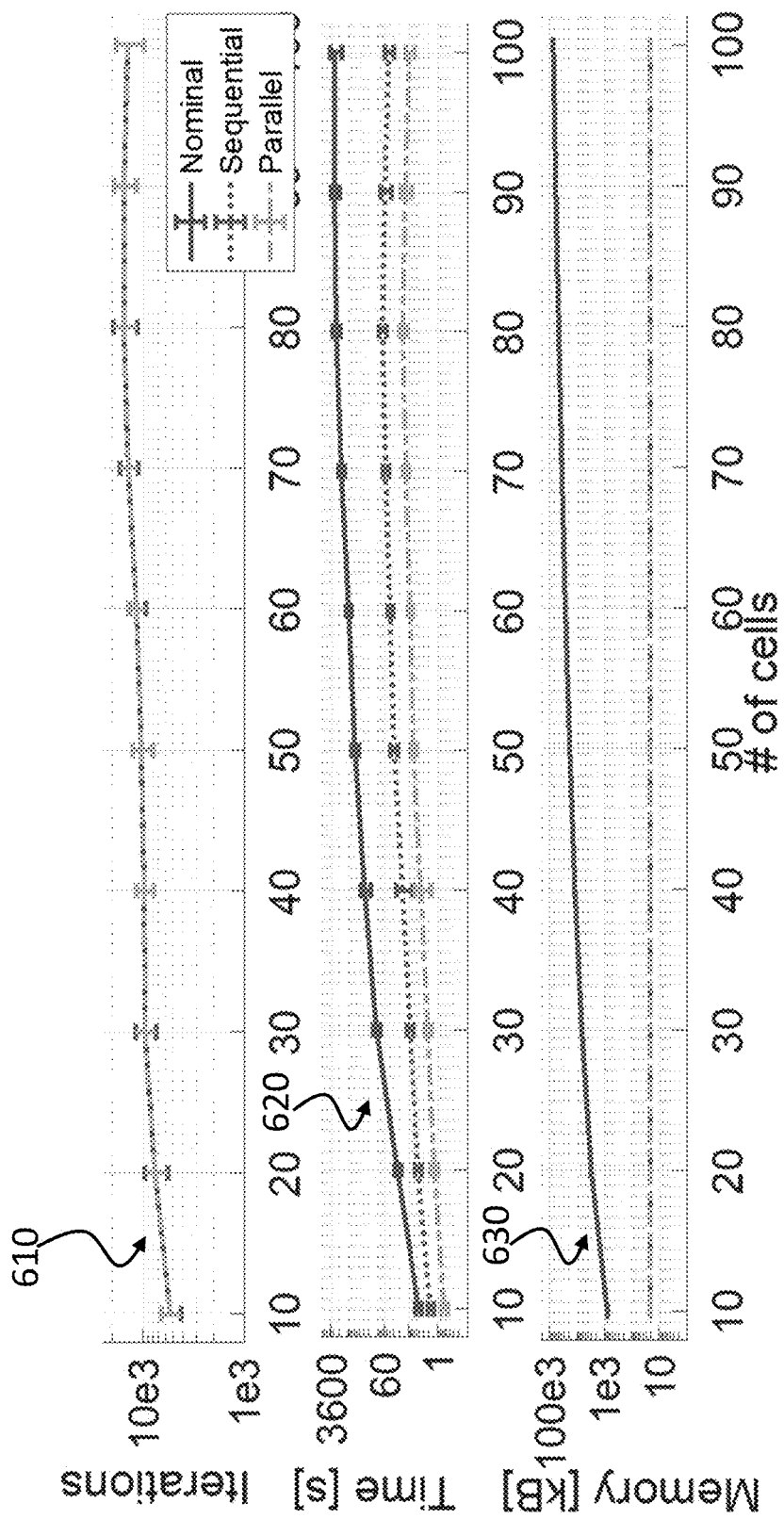
FIG. 6 shows simulation results showing the computational and memory benefits according to one embodiment.

FIG. 6 shows the computational advantages of an embodiment controlling battery packs ranging from m=10 cells, which would be found in an appliance, to m=100 cells, which would be found in an electric vehicle. For each battery size m, the CFTOC (1) is solved for 10 randomly generated initial cell imbalances x(t). The termination toleration used for all algorithms was $\varepsilon=10^{-8}$.

FIG. 6 shows the performance of the baseline ADMM and the symmetric ADMM of some embodiments with both a sequential and parallel implementation. The first sub-FIG. 610 shows the number of iterations required to solved the CFTOC (1). Note that the number of iterations is identical for each of the ADMM implementation. This empirically verifies our assertion that the decomposition does not change the number of iteration required to find the optimal solution.

On the other hand, the second sub-FIG. 620 shows that both the sequential and parallel implement of the invention are significantly faster than the baseline ADMM. This empirically verifies that the symmetric decomposition reduces the computational cost of each iteration of the ADMM. The computational cost of implementing the invention grow linearly with the pack size m instead of quadratically for the baseline ADMM. As a result, the symmetric ADMM outperform the baseline ADMM as the number of cells increases. For the largest battery pack m=100, the baseline algorithm spent more than 1 hour solving the CFTOC (1) whereas the sequential implementation of the invention solved the CFTOC (1) in less than 1 minute, which is the typical sample period for this problem. The parallel implementation of the invention was even faster, spending approximately 10 seconds for the largest problem. Thus, the symmetric ADMM makes it possible to compute the optimal balancing current in real-time as needed for active battery balancing.

The memory benefits of the symmetric ADMM over the baseline ADMM are even more impressive. The third sub-figure 630 in FIG. 6 shows the memory usages for each of the implementation of ADMM. The memory required for the symmetric ADMM is constant regardless of the pack size m whereas the memory required for the baseline ADMM grows quadratically with the problem size. For the largest battery pack m=100, the baseline ADMM required over 100 megabytes of memory whereas the invention required approximately 10 kilobytes. Thus, a battery controller employing the invention requires less read-only memory and therefore the battery management system can be made less expensive.

Application: Heating Ventilation and Air Conditioning

Figure 7:
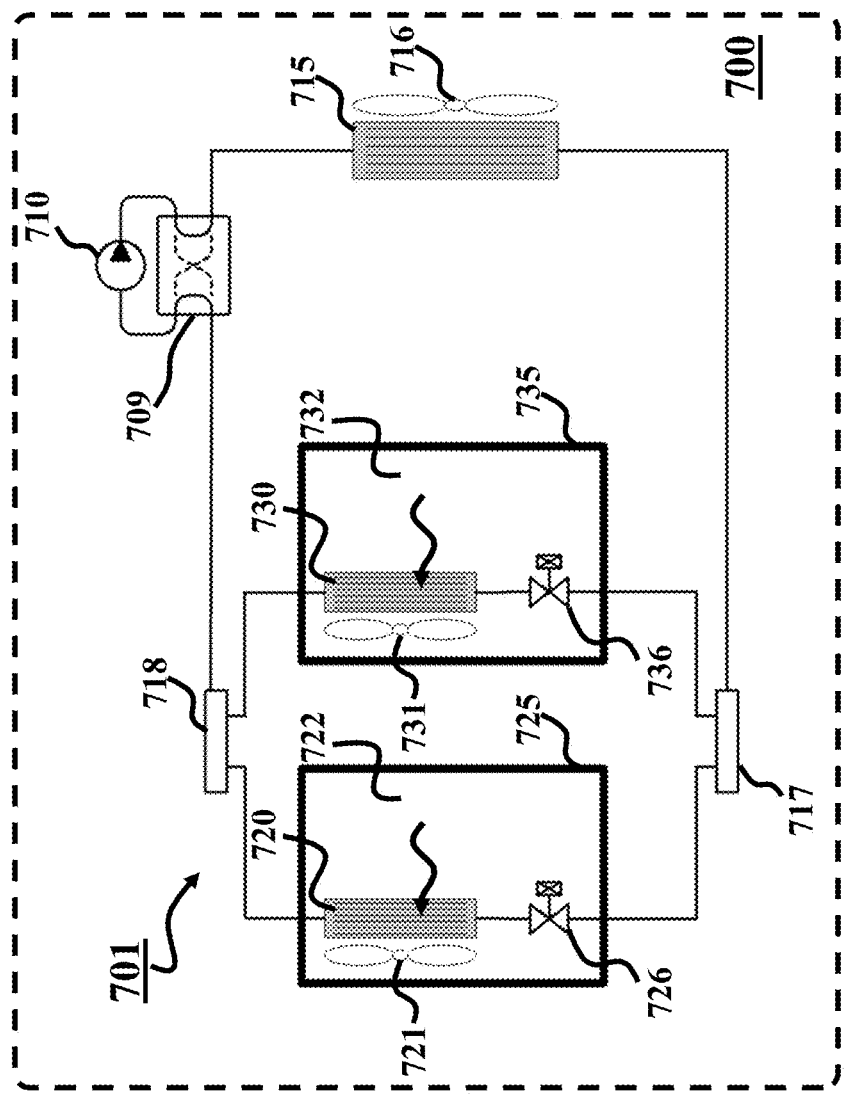
FIGS. 7 and 8 show schematic of an HVAC system controlled according to principles employed by some embodiments.
Figure 8:
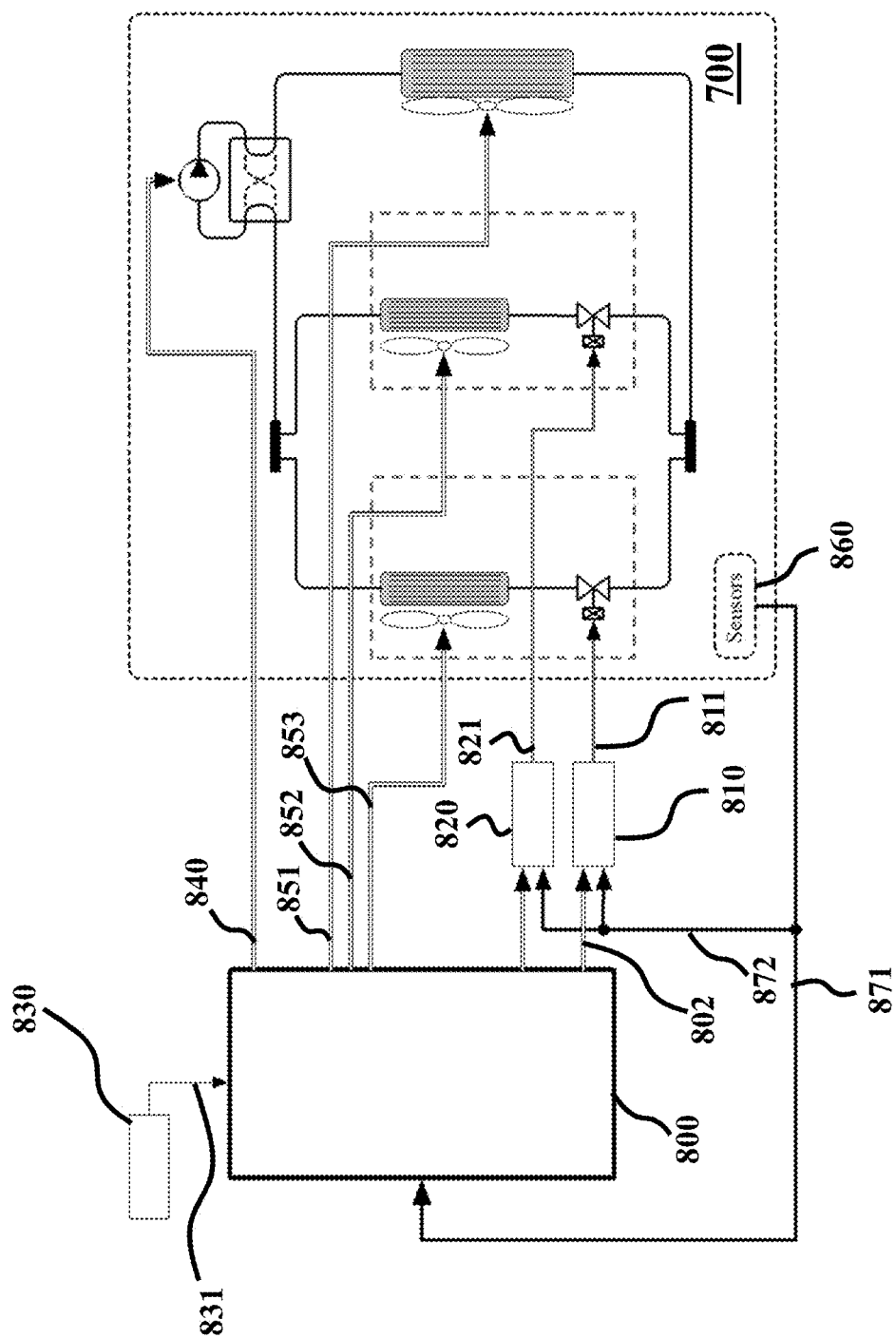

FIGS. 7 and 8 show schematic of an HVAC system controlled according to principles employed by some embodiments. FIG. 7 shows block diagrams of a heating, ventilation, and air conditioning (HVAC) system (700) controlled by a controller (701) according to principles employed by some embodiments of the invention. The HVAC system includes a compressor and a set of heat exchangers configured for controlling environments in a set of rooms.

In this disclosure, a two indoor unit HVAC system is depicted and described for clarity, but it should be understood that any number of indoor units can be used, subject to the physical limitations of refrigerant line lengths, capacity and pumping power of the compressor, and building codes. A compressor (710) receives a low-pressure refrigerant in a vapor state and performs mechanical work to increase the pressure and temperature of the refrigerant. Depending on the configuration of a four-way valve (709), the high temperature refrigerant can be routed to either an outdoor heat exchanger (in which case the system moves heat to the outside environment and is providing useful cooling and is said to operate in cooling mode) or to an indoor heat exchanger (in which case the system moves heat to one or more indoor units and is providing useful heating and is said to operate in heating mode).

For clarity and in order to simplify the subsequent description, a cooling mode is generally considered, i.e., the compressor is connected to the rest of the vapor compression system as shown as solid lines of the four-way valve (709), but it should be understood that analogous statements can be made about the system operating in heating mode with appropriate substitutions, e.g., condenser for evaporator, condensing temperature for evaporating temperature, etc.

In cooling mode, the high-temperature, high-pressure refrigerant moves to an outdoor heat exchanger (715) and in the case of an air-source vapor compression system, an associated optional fan (716) blows air across the heat exchanger, where the air acts as a heat source or sink as shown in FIG. 7. In the case of a ground-source vapor compression system, components of outdoor heat exchanger may be buried underground or otherwise in direct contact with earth or water, and in that case, the ground environment acts as a heat source or sink. Heat is transferred from the refrigerant to the environmental heat source or sink, causing the refrigerant in the outdoor heat exchanger to condense from a vapor to a liquid.

The phase change process wherein vapor refrigerant condenses from saturated vapor to a two-phase mixture of both liquid and vapor to saturated liquid is isothermal in ideal descriptions of the vapor compression cycle, that is, the phase change process occurs at a constant temperature and therefore without a sensible change in temperature. However, if further heat is removed from the saturated liquid, the temperature of the saturated liquid then decreases by some amount and the refrigerant is termed "subcooled". The subcool temperature is the temperature difference between the subcooled refrigerant and the calculated saturated liquid refrigerant temperature at the same pressure.

Liquid high temperature refrigerant exits the outdoor heat exchanger and is split by a manifold (717) in order to distribute the refrigerant between the subsequently connected indoor units (725) or (735). Separate expansion valves (726), (736) are connected to the inlet manifold. These expansion valves are restriction elements and cause the pressure of the refrigerant to be substantially reduced. Since the pressure is reduced without substantial heat exchange in the valve, the temperature of the refrigerant is substantially reduced, termed "adiabatic" in ideal descriptions of the vapor compression cycle. The resulting refrigerant exiting the valves is a low pressure, low temperature two-phase mixture of liquid and vapor.

Two-phase refrigerant enters the indoor heat exchangers (720), (730) where associated fans (721), (731) move air across the heat exchangers. Heat (722), (732) representing the thermal loads from the indoor spaces is transferred from the rooms to the refrigerant, causing the refrigerant to evaporate from a two-phase mixture of liquid and vapor to a saturated vapor state.

The phase change process wherein refrigerant evaporates from a saturated vapor to a two-phase mixture of both liquid and vapor to saturated vapor is isothermal in ideal descriptions of the vapor compression cycle, i.e., occurs at a constant temperature and therefore is a process that occurs without a sensible change in temperature. However, if further heat is added to the saturated vapor, the temperature of the saturated vapor then increases by some amount and the refrigerant is termed "superheated". The superheat temperature is the difference between the superheated refrigerant vapor and the calculated saturated vapor temperature at the same pressure.

The low pressure refrigerant vapor exiting the indoor unit heat exchangers is rejoined to a common flow path at the outlet manifold (718). Finally, low pressure refrigerant vapor is returned to the compressor and the cycle repeats.

The principal actuators in the HVAC (700) may include the compressor (710), the outdoor heat exchanger fan (716), the indoor heat exchanger fans (721), (731) and the expansion valves (726), (736). The HVAC system (700) is controlled by a reconfigurable controller (800) that determines commands issued to the actuators of the HVAC system. The commands may include a compressor speed command (850), an outdoor unit fan speed command (851), or indoor unit fan speed commands (852), (853). The indoor unit fan speed commands may alternatively be determined by the occupants as described below. The controller (800) receives sensor information (871) from sensors (870) arranged at various locations on the system. The spatial arrangement of sensors are not depicted in FIG. 7 for clarity and simplicity, and their precise locations within the system are not pertinent to the invention. Additionally, the controller receives set-point information (831) from an external source such as an occupant entering desired room temperatures in a user interface module (830).

In some systems, the compressor speed command (850) can be fixed to one or more predetermined settings, or it can be varied continuously. Similarly, the outdoor heat exchanger fans (716) can operate at fixed speeds or it can be varied continuously. In some configurations, an indoor heat exchanger fan (721), (731) can be determined by the controller (800), or its speed can be determined by an occupant when the occupant wishes to directly control indoor airflow. In the case an indoor fan speed is determined by the controller, the fan speed is treated by the controller as a control input for manipulating the operation of the system. In the case an indoor fan speed is specified by an occupant, the fan speed is treated by the controller as a measured disturbance acting on the system. The expansion valves (726), (736) are controlled by the controller and may vary from a fully closed to a fully open position, including one or more intermediate positions. Some system implementations substitute electronically-controlled expansion valves with a series combination of a solenoid valve for on/off control, and a separate variable opening valve for precise flowrate control. The control inputs associated with these actuators are the compressor rotational frequency (CF) command (850), the outdoor fan speed (ODF) command (851), and each electronic expansion valve opening position (EEVi) command (811), (821).

Additional disturbances acting on the HVAC system include the heat load (722), (732) associated with each indoor unit and the outdoor air temperature (OAT). Heat loads are the amount of thermal energy moved from the indoor units to the outdoor unit per unit time. The total heat is then rejected to the atmosphere at the outdoor heat exchanger temperature, which is determined by both the OAT (a disturbance signal) and the state of the machine actuators.

The available sensors (870) can include temperature sensors that measure the evaporating temperature Te, the condensing temperature Tc, the compressor discharge temperature Td, and the air temperature Tri in each room, labeled (871), or that measure other temperatures, pressures, or flow rates. Additionally, each indoor unit may include heat exchanger coil temperature sensors (HX coil) that measure the refrigerant temperature at various locations along the heat exchanger, labeled (872).

Some embodiments can include capacity controllers for each indoor unit. The capacity controllers (810) receive commands (802) from the controller (800) that indicate a desired reference cooling capacity, which is the proportional to the desired amount of heat removed from the room by each evaporator per unit time. The capacity controller (810) determines a command (811) for the EEV position to produce the desired cooling capacity, based on measurements of the coil temperatures (HX coil) (872). These capacity controllers account for the fact that the effect of EEV positions on room temperatures is nonlinear. The cooling capacity controllers linearize the responses from the reference cooling capacity (802) of each room CCCi to the associated room temperature Tri.

The symmetry of the HVAC systems is due to the fact that HVAC system is assembled from a limited catalog of subsystem. Specifically, the HVAC system shown in FIG. 7 is comprised of 1 outdoor unit connected to m indoor units which are of the same design. The HVAC system is symmetric with respect to the symmetric group $\mathfrak{S}_m$ where m is the number of rooms or indoor units. Therefore, the embodiments are advantageous of this type of HVAC system.

A generic linear model of the HVAC system can be written as $$G = \begin{bmatrix} A & B_1 & \cdots & B_m & B_o \\ C_1 & D_{11} & \cdots & D_{1m} & D_{10} \\ \vdots & \vdots & \ddots & \vdots & \vdots \\ C_m & D_{m1} & \cdots & D_{mn} & D_{mo} \\ C_o & D_{o1} & \cdots & D_{om} & D_{oo} \end{bmatrix}. \quad (16)$$

$$\begin{bmatrix} A & B \\ C & D \end{bmatrix}$$

where the state-space notation is short-hand for the set of differential equations $$x(t+1)=Ax(t)+Bu(t)$$

$$y(t)=Cx(t)+Du(t).$$

where $u(t) \in \mathbb{R}^{n_u}$ is a vector containing all the control inputs (301) to the system, $y(t) \in \mathbb{R}^{n_y}$ is a vector containing all the constrained outputs from the system (100), and $x(t) \in \mathbb{R}^{n_x}$ is the non-physical state of the model. The input matrices $B_1, \ldots, B_m$ describe how the inputs to each of the m indoor units affect the system and the input matrix $B_o$ describes how the inputs of the outdoor unit affect the dynamics. Likewise, the output matrices $C_1, \ldots, C_m$ describe how the dynamics effect the outputs of the m indoor units and $C_o$ describes how the state affects the outdoor unit outputs. The $D_{ij}$ matrices relate the feedthrough from the input j-th indoor/outdoor unit to the output of the i-th indoor/outdoor unit.

The symmetries of the HVAC system have the form (3) where $n_u^1$ is the size of the input matrices $B_i \in \mathbb{R}^{n_x \times n_u^1}$ for $i=1, \ldots, m$ and $n_u^{m+1}$ is the size of the input matrix $B_o \in \mathbb{R}^{n_x \times n_u^{m+1}}$. Likewise, 4 is the size of the output matrices $C_i \in \mathbb{R}^{n_y^1 \times n_x}$ for $i=1, \ldots, m$ and $n_y^{m+1}$ is the size of the output matrix $C_o \in \mathbb{R}^{n_y^{m+1} \times n_x}$. The symmetries (3) permute the inputs/outputs of each indoor unit and the inputs/outputs of the outdoor unit are fixed.

Applying the symmetric decomposition (10) to the dynamics (16), decomposes the system into m decoupled subsystems. The first m−1 subsystem are identical and have the form $$\hat{G}_{ii} = \begin{bmatrix} A & B_1 - B_2 \\ C_1 & D_{11} - D_{12} \end{bmatrix}, \quad (17a)$$

for $i=1, \ldots, m-1$. The subsystem (17a) has the same number of inputs/outputs as a single indoor unit. The last subsystem includes the dynamics of the outdoor unit and the average dynamics of all the indoor units. It is described by the dynamics $$\hat{G}_{m+1} = \begin{bmatrix} A & B_1 + (r-1)B_2 & B_o \\ C_1 & D_{11} + (r-1)D_{12} & \sqrt{m} D_{01} \\ C_o & \sqrt{m} D_{o1} & D_{oo} \end{bmatrix}. \quad (17b)$$

The number of inputs $n_u^1 + n_u^o$ for this subsystem is equal to the number of inputs for an indoor unit plus the number of inputs for the outdoor unit. Likewise, the number of outputs $n_y^1 + n_y^o$ is the sum of the number of outputs of an indoor and outdoor unit. A symmetric cost function can also be decomposed. For instance, if each indoor unit is given the same weight.

According to principles of symmetric ADMM of FIG. 4, first the state of the HVAC system is measured (401). The symmetric ADMM iterates (402)-(404) to find the optimal solution. In particular, the initial state of the system $x_0$, dual variables $\gamma_k$, and constrained outputs $y_k$ are transformed (408) into the symmetric domain using the transformation (20). The unconstrained optimal control problem can then be more easily solved (402) by the decomposition (5.7) of the dynamics. The resulting state $\hat{x}_k^i$ and input $\hat{u}_k^i$ trajectories are inverse-transformed (409) into the original domain where the other subproblems (403) and (404) are solved. The symmetric ADMM iterates until the dual-variables and constrained outputs have converged (406). Then the resulting control input is applied to the HVAC system.

If the system implementing the symmetric ADMM for controlling of HVAC system has a single processor, located for instance in the outdoor unit, then the symmetric ADMM computes the control input approximately m times faster than the baseline algorithm. If the symmetric ADMM is implemented with multiple processors, located for instance in each indoor unit, then the system implementing the symmetric ADMM computes the control input between m and $m^2$ times faster than the baseline ADMM. For a building with a large number of indoor units m>>1 this provides a significant reduction in the computation-time. Furthermore, the amount of read-only memory needed by the controller will be fixed regardless of the number of indoor units m.

Figure 9A:
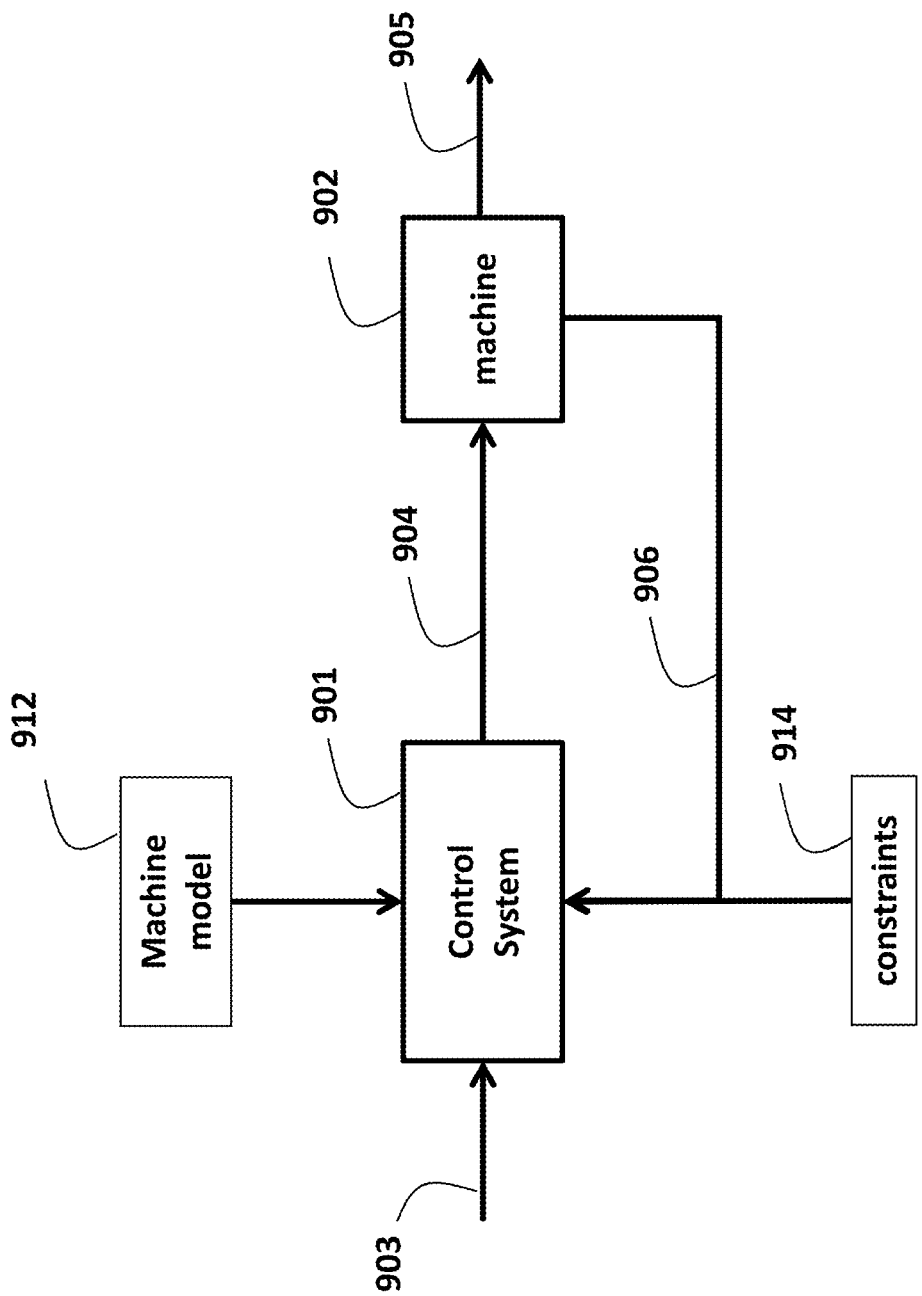
FIG. 9A is a block diagram of a controller for controlling an operation of a machine according to one embodiment.

FIG. 9A shows a block diagram of a control system 901 for controlling an operation of a machine 902. The machine 902 is a device whose operation changes quantities such as positions, velocities, currents, temperatures, numerical values, in response to commands. As used herein, the operation of the machine determines a motion of the machine that changes such quantities. The control system receives a desired motion 903 for the machine, such as a desired trajectory or target point for some of the quantities, and controls the machine via control inputs 904. The control inputs can include commands to change parameters of the operation of the machine or can include actual values of the parameters such as voltages, pressures, torques, forces that affect the machine motion resulting in the generation of quantities 905 for the machine.

The control system 901 receives information 906 about the machine motion, from sensors, hardware, or software connected directly or remotely to the machine. The information 906 includes a state of the machine. The machine uses the state for the selection of the control inputs 904. The information 906 can include some or all of the motion quantities 905 and can also include additional information about the machine. The quantities 905, the control inputs 904 or a combination thereof, can be requested to remain in some pre-defined ranges according to constraints 914 on the operation of the machine.

Figure 9B:
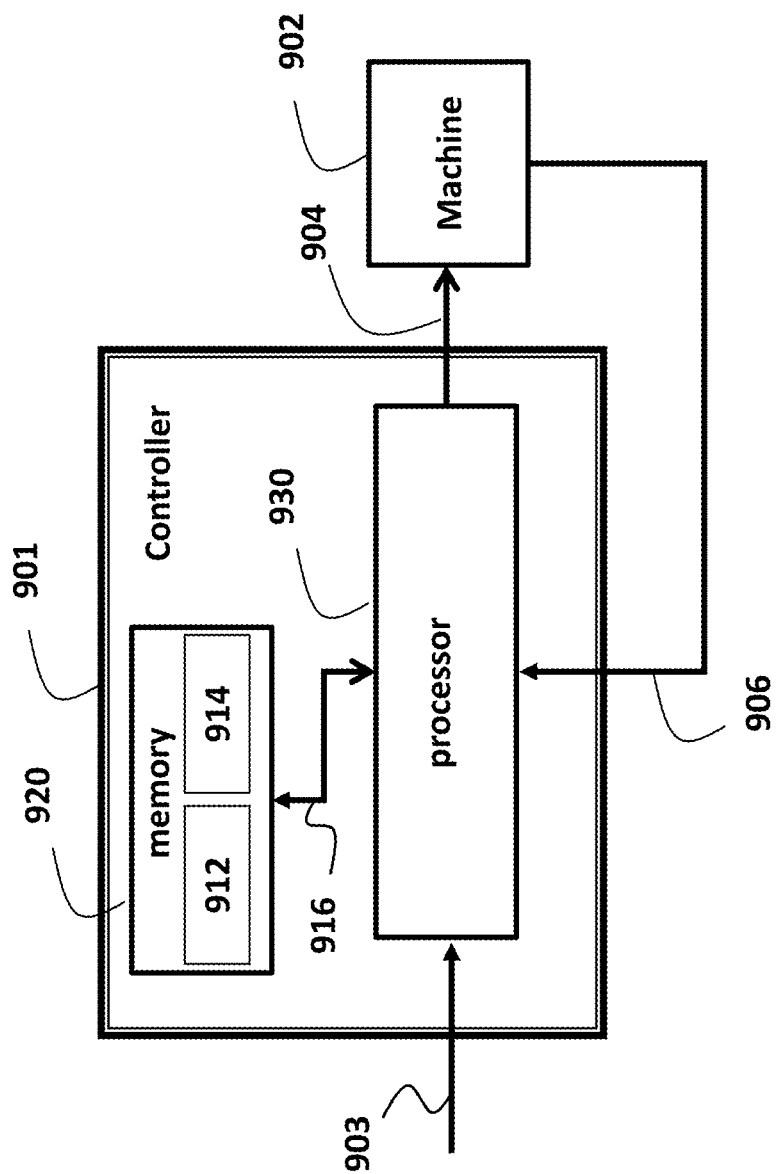
FIG. 9B is a block diagram of a general structure of the controller of FIG. 9A according to one embodiment.

FIG. 9B shows a general structure of the control system 901 according one embodiment of the invention. The control system 901 includes at least one processor 930 for executing modules of the controller. The processor 930 is operatively connected to a memory 920 for storing the model 912 and the constraints 914. It is an objective of some embodiments to determine the control inputs 904 using a model of the machine 912 subject to the constraints 914 in an efficient manner using symmetric AMDD described above.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A method for controlling an operation of a machine exhibiting symmetries in dynamics of the machine, a cost of the operation of the machine, and constraints on the operation of the machine, wherein the method uses at least one processor coupled with stored instructions implementing the method, wherein the instructions, when executed by the processor carry out steps of the method comprising:

performing iteratively a control optimization until a termination condition is met to produce an optimal control input, wherein an iteration includes
  transforming control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine;
  solving an optimal control problem of the control inputs and the state for fixed values of the output and the dual variables in the symmetric domain;
  transforming the control inputs and the state from the symmetric domain into the original domain using an inverse of the symmetric transformation;
  projecting the outputs corresponding to the control inputs and the state in the original domain onto the constraints; and
  updating the dual variable based on the projected outputs; and
  controlling the machine according to the optimal control input.

2. The method of claim 1, wherein the symmetries are permutations of inputs and output of the machine that are invariant to the dynamics of the machine, the cost of the operation of the machine, and the constraints on the operation of the machine.

3. The method of claim 1, wherein the symmetric transformation includes a matrix transformation of a difference between an upper triangular matrix of ones and a super-diagonal matrix of sequentially descending numbers, wherein the size of the lower triangular matrix and the size of the super-diagonal matrix equal the size of the symmetries of the machine.

4. The method of claim 1, wherein the symmetric transformation includes an iterative linear transformation of elements of a vector using a scaled difference between a running-sum of an element of the vector z and a next element of the vector.

5. The method of claim 1, wherein the symmetric transformation includes a matrix product of the control inputs to the machine, the state of the machine, the output of the machine, and the dual variables with corresponding transformation matrix of a form $$\Phi_{u,y,x} = \begin{bmatrix} \Phi \otimes I_{n_{u,y,x}^1} & 0 \\ 0 & I_{n_{u,y,x}^{m+1}} \end{bmatrix},$$

wherein $$\Phi = \begin{bmatrix} 1 & 1 & 1 & \ldots & & 1 \\ -1 & 1 & 1 & \ldots & & 1 \\ & -2 & 1 & \ldots & & 1 \\ & & \ddots & \ddots & & \vdots \\ & & & & -m+1 & 1 \end{bmatrix} \Lambda \in \mathbb{R}^{m \times m},$$

wherein $\Lambda \in \mathbb{R}^{m \times m}$ is a diagonal matrix, with elements $\lambda_{ii} = 1/\sqrt{i^2 + i}$ for $i = 1, \ldots, m-1$ and $\lambda_{mm} = 1/\sqrt{m}$, that ensures that the column-vectors of $\Phi$ are unit-vectors, wherein m is the size of symmetries, I is an identity matrix of size n, wherein u is the input, y is the output, and x is the state of the machine.

6. The method of claim 1, wherein the symmetric decomposition finds orthogonal transformations of the inputs, outputs, and states $\Phi_{u,y,x} \in \mathbb{R}^{n_{u,y,x} \times n_{u,y,x}}$ that decompose the dynamics $$\begin{bmatrix} \Phi_x^i & 0 \\ 0 & \Phi_y^i \end{bmatrix}^T \begin{bmatrix} A & B \\ C & D \end{bmatrix} \begin{bmatrix} \Phi_x^j & 0 \\ 0 & \Phi_u^j \end{bmatrix} = \begin{pmatrix} \begin{bmatrix} \hat{A}^{ii} & \hat{B}^{ii} \\ \hat{C}^{ii} & \hat{D}^{ii} \end{bmatrix} & \text{if } i = j \\ 0 & \text{if } i \neq j \end{pmatrix} \quad (18)$$

and the cost $$\begin{bmatrix} \Phi_x^i & 0 \\ 0 & \Phi_u^i \end{bmatrix}^T \begin{bmatrix} Q & S \\ S^T & R \end{bmatrix} \begin{bmatrix} \Phi_x^j & 0 \\ 0 & \Phi_u^j \end{bmatrix} = \begin{pmatrix} \begin{bmatrix} \hat{Q}^{ii} & \hat{S}^{ii} \\ \hat{S}^{iiT} & \hat{R}^{ii} \end{bmatrix} & \text{if } i = j \\ 0 & \text{if } i \neq j \end{pmatrix} \quad (19)$$

where $\hat{A}^{ii}=\Phi_x^{iT}A\Phi_x^i$, $\hat{B}^{ii}=\Phi_x^{iT}B\Phi_x^i$, $\hat{C}^{ii}=\Phi_x^{iT}C\Phi_x^i$, and $\hat{D}^{ii}=\Phi_x^{iT}D\Phi_x^i$, are the dynamics matrices in the symmetric domain, $\hat{Q}^{ii}=\Phi_x^{iT}Q\Phi_x^i$, $\hat{R}^{ii}=\Phi_x^{iT}R\Phi_x^i$, and $\hat{S}^{ii}=\Phi_x^{iT}S\Phi_x^i$, are cost matrices in the symmetric domain that defines the cost.

7. The method of claim 1, wherein the solving of the optimal control problem including solving $$\min_{\hat{x}_k^i, \hat{u}_k^i} \sum_{k=0}^{N-1} \begin{bmatrix} \hat{x}_k^i \\ \hat{u}_k^i \end{bmatrix}^T \begin{bmatrix} \hat{Q}^{ii} & \hat{S}^{ii} \\ \hat{S}^{iiT} & \hat{R}^{ii} \end{bmatrix} \begin{bmatrix} \hat{x}_k^i \\ \hat{u}_k^i \end{bmatrix} + \rho \| \hat{C}^{ii}\hat{x}_k^i + \hat{D}^{ii}\hat{u}_k^i - \hat{r}_k^i \|^2$$

s.t. $\hat{x}_{k+1}^i = \hat{A}^{ii}\hat{x}_k^i + \hat{B}^{ii}\hat{u}_k^i$, $\hat{x}_0^i = \hat{x}^i(t)$, for i=1, . . . , m where $x_k^i=\Phi_x^{iT}x_k$, $\hat{u}_k^i=\Phi_u^{iT}u_k$, $\hat{r}_k^i=\Phi_y^{iT}r_k$ are the i-th components of the state $x_k$, input $u_k$, and reference $r_k$ respectively in the symmetric domain, $\hat{A}^{ii}=\Phi_x^{iT}A\Phi_x^i$, $\hat{B}^{ii}=\Phi_x^{iT}B\Phi_x^i$, $\hat{C}^{ii}=\Phi_x^{iT}C\Phi_x^i$, and $\hat{D}^{ii}=\Phi_x^{iT}D\Phi_x^i$, are the dynamics matrices in the symmetric domain, $\hat{Q}^{ii}=\Phi_x^{iT}Q\Phi_x^i$, $\hat{R}^{ii}=\Phi_x^{iT}R\Phi_x^i$, and $\hat{S}^{ii}=\Phi_x^{iT}S\Phi_x^i$, are cost matrices in the symmetric domain that defines the cost.

8. The method of claim 1, wherein the control optimization uses a symmetric alternating direction method of multipliers that updates the dual variables in the original domain and solves the optimal control problem for fixed values of the dual variables in the symmetric domain.

9. The method of claim 1, wherein the control optimization uses a symmetric alternating direction method of multipliers that updates the dual variables in the symmetric domain and solves the optimal control problem for fixed values of the dual variables in the symmetric domain.

10. The method of claim 1, wherein the symmetric transformation decomposes the optimal control problem into a plurality of sub-problems that are solved in parallel on multiple processors.

11. The method of claim 1, wherein the control optimization is performed over a receding horizon using a model of the machine.

12. The method of claim 1, wherein the symmetry of the machine is due to one or combination of duplication of components of the machine and duplication of the operations of similar or dissimilar components of the machine.

13. The method of claim 12, wherein the machine is a battery, wherein the symmetry is due to similarities of cells of the battery, and wherein the concurrent control balances charges of the cells of the battery.

14. The method of claim 12, wherein the machine is a vapor compression machine, wherein the symmetry is due to similarities of indoor vapor compression units of the vapor compression machine, and wherein the concurrent control balances heat exchange performed by the indoor vapor compression units.

15. The method of claim 12, wherein the machine is a platoon of vehicles, wherein the symmetry is due to similarities of operations of the vehicles in the platoon.

16. A system for controlling an operation of a machine exhibiting symmetries in dynamics of the machine, a cost of the operation of the machine, and constraints on the operation of the machine, comprising:

at least one processor configured to performed iteratively a control optimization until a termination condition is met to produce an optimal control input and control the machine according to the optimal control input, wherein for performing an iteration, the processor is configured to transform control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine;

solve an optimal control problem of the control inputs and the state for fixed values of the output and the dual variables in the symmetric domain;

transform the control inputs and the state from the symmetric domain into the original domain using an inverse of the symmetric transformation;

project the outputs corresponding to the control inputs and the state in the original domain onto the constraints; and update the dual variable based on the projected outputs.

17. The system of claim 16, wherein the symmetric transformation decomposes the optimal control problem into a plurality of sub-problems, wherein the at least one processor includes a plurality of processors configured to solve the plurality of sub-problems in parallel.

18. The system of claim 16, wherein the symmetric transformation includes a matrix transformation of a difference between an upper triangular matrix of ones and a super-diagonal matrix of sequentially descending numbers, wherein the size of the lower triangular matrix and the size of the super-diagonal matrix equal the size of the symmetries of the machine.

19. The system of claim 16, wherein the symmetric transformation includes an iterative linear transformation of elements of a vector using a scaled difference between a running-sum of an element of the vector z and a next element of the vector.

20. A non-transitory computer readable storage medium embodied thereon a program executable by a processor for performing a method, the method comprising:

performing iteratively a control optimization until a termination condition is met to produce an optimal control input, wherein an iteration includes transforming control inputs to the machine, a state of the machine, an output of the machine, and dual variables from an original domain to a symmetric domain using a symmetric transformation, wherein the symmetric transformation decomposes the dynamics of the machine, the cost of the operation of the machine, and the constraints on the operation of the machine;

solving an optimal control problem of the control inputs and the state for fixed values of the output and the dual variables in the symmetric domain;

transforming the control inputs and the state from the symmetric domain into the original domain using an inverse of the symmetric transformation;

projecting the outputs corresponding to the control inputs and the state in the original domain onto the constraints; and updating the dual variable based on the projected outputs; and controlling the machine according to the optimal control input.

* * * * *